US009129204B2

United States Patent
Ishikawa et al.

(10) Patent No.: US 9,129,204 B2
(45) Date of Patent: Sep. 8, 2015

(54) CARD READER

(71) Applicant: NIDEC SANKYO CORPORATION, Suwa-gun, Nagano (JP)

(72) Inventors: Kazutoshi Ishikawa, Nagano (JP); Kazunori Takahashi, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/389,895

(22) PCT Filed: Sep. 27, 2013

(86) PCT No.: PCT/JP2013/076322
§ 371 (c)(1),
(2) Date: Oct. 1, 2014

(87) PCT Pub. No.: WO2014/057819
PCT Pub. Date: Apr. 17, 2014

(65) Prior Publication Data
US 2015/0060546 A1 Mar. 5, 2015

(30) Foreign Application Priority Data

Oct. 11, 2012 (JP) .................. 2012-225680

(51) Int. Cl.
G06K 7/00 (2006.01)
G06K 13/08 (2006.01)
G06K 7/08 (2006.01)
G06K 13/06 (2006.01)

(52) U.S. Cl.
CPC .............. *G06K 13/08* (2013.01); *G06K 7/0004* (2013.01); *G06K 7/0026* (2013.01); *G06K 7/084* (2013.01); *G06K 13/06* (2013.01); *G06K 13/0881* (2013.01)

(58) Field of Classification Search
CPC ........... G06K 7/00; G06K 7/02; G06K 13/00; G06K 13/08; G06K 13/077
USPC .................. 235/440, 449, 475, 480, 481, 439
See application file for complete search history.

(56) References Cited

U.S. PATENT DOCUMENTS

| 2009/0047052 A1* | 2/2009 | Koyabu .......................... 400/611 |
| 2011/0062271 A1* | 3/2011 | Yanagishita ................ 242/390.2 |
| 2011/0135369 A1* | 6/2011 | Hagiyama ..................... 400/578 |
| 2012/0050438 A1* | 3/2012 | Wada ............................. 347/104 |

FOREIGN PATENT DOCUMENTS

| JP | 7-282205 A | 10/1995 |
| JP | 9-128872 A | 5/1997 |
| JP | 2013-164675 A | 8/2013 |

OTHER PUBLICATIONS

International Search Report for International Application No. PCT/JP2013/076322; Date of Mailing, Dec. 10, 2013; with English translation.

* cited by examiner

Primary Examiner — Edwyn Labaze
(74) Attorney, Agent, or Firm — Cantor Colburn LLP

(57) ABSTRACT

A card reader may include a card conveying mechanism structured to convey the card; a conveying passage; a magnetic head to abut a magnetic stripe formed on a card and read or record data on the card; a head moving mechanism to move the magnetic head; and an abutting part abutting with one end of the card. The card conveying mechanism may include a drive source, and a first conveying roller and a second conveying roller. The first conveying roller is disposed on one end side of the conveying passage. The second conveying roller is disposed on the other end of the conveying passage. The card conveying mechanism may include a first torque limiter disposed in a power transmission path from the drive source to the first conveying roller, and a second torque limiter disposed in a power transmission path from the drive source to the second conveying roller.

11 Claims, 12 Drawing Sheets

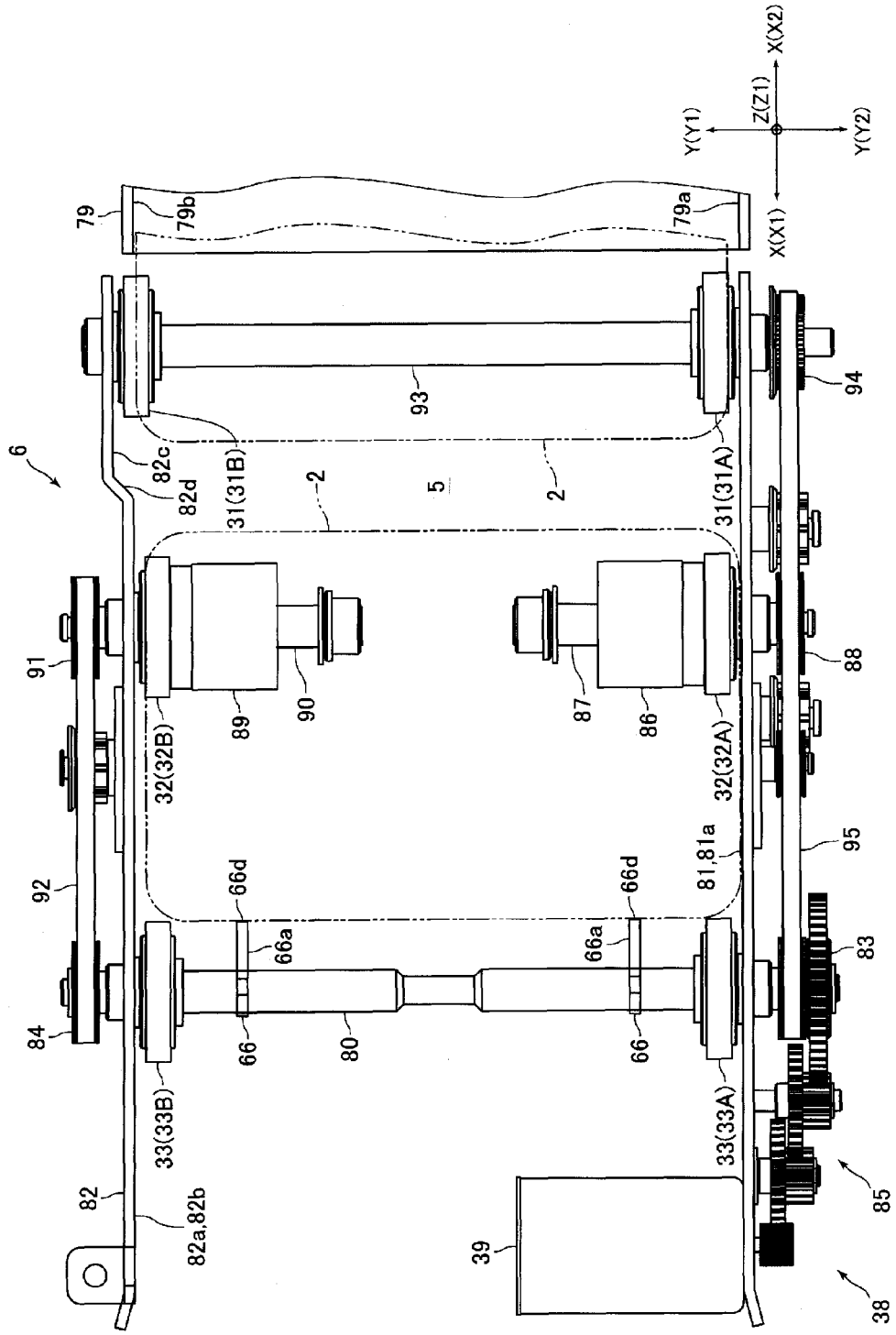

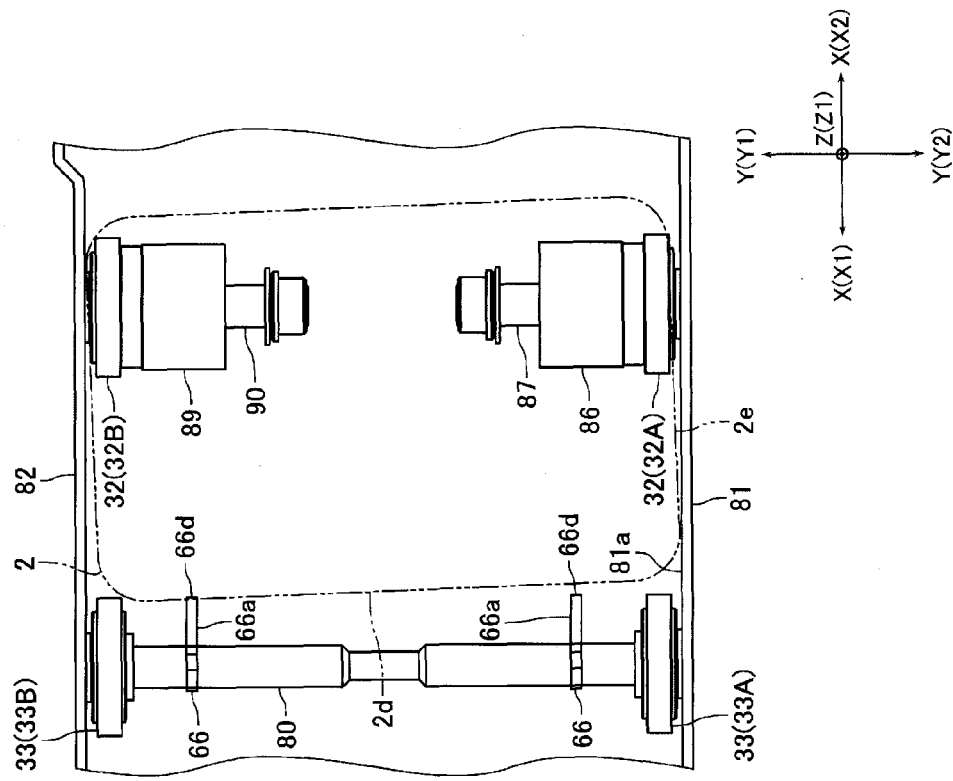
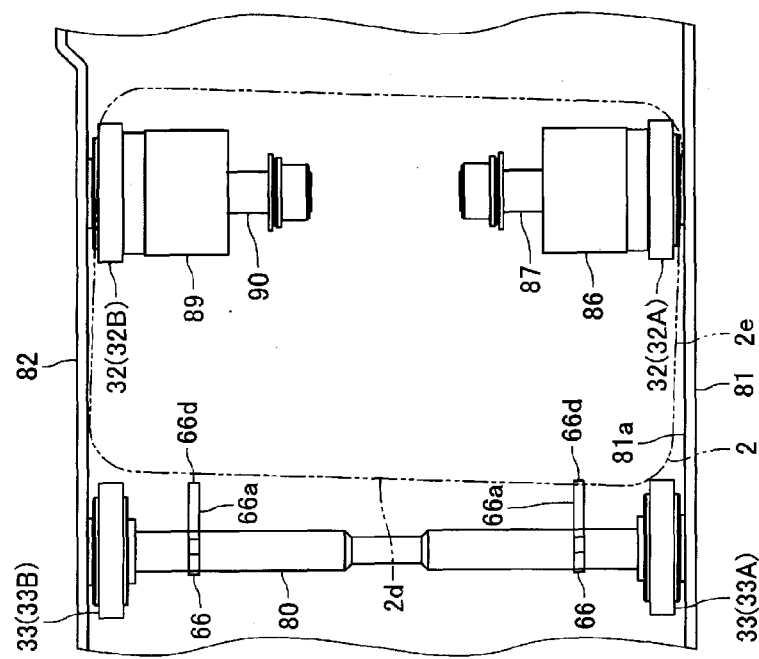

CARD READER

CROSS REFERENCE TO RELATED APPLICATIONS

This is the U.S. national stage of International Application No. PCT/JP2013/076322, filed on Sep. 27, 2013. Priority under 35 U.S.C. §119(a) and 35 U.S.C. §365(b) is claimed from Japanese Application No. 2012-225680, filed Oct. 11, 2012.

FIELD OF THE INVENTION

The present invention relates to a card reader which conveys a card formed in a substantially rectangular shape in its short widthwise direction for processing.

BACKGROUND

Conventionally, a magnetic head moving type magnetic stripe reading/writing device has been known in which reading of magnetic data from a magnetic stripe formed on a magnetic medium and writing of magnetic data to a magnetic stripe are performed (see, for example, Patent Literature 1). A magnetic medium which is processed in the magnetic stripe reading/writing device described in Patent Literature 1 is formed with a magnetic stripe in a direction perpendicular to a conveying direction of the magnetic medium. The magnetic stripe reading/writing device includes a slide mechanism, which moves the magnetic head in a direction where the magnetic stripe is formed, and conveying rollers for conveying the magnetic medium in a direction perpendicular to the moving direction of the magnetic head.

A shape of a card having a magnetic stripe is specified in the international standard and JIS standard and is formed in a substantially rectangular shape whose four corners are rounded. Further, in a card with a magnetic stripe in conformity with the international standard and JIS standard, the magnetic stripe is formed in a long and thin strip shape which is parallel to a longitudinal direction of the card formed in a substantially rectangular shape and is formed on a rear face of the card. Further, a position of the magnetic stripe in the short widthwise direction of the card is also specified in the international standard and JIS standard and the magnetic stripe is formed in a predetermined range with one end of the card in the short widthwise direction of a card as a reference.

A contact type IC card with a built-in IC chip has been known. In a contact type IC card in conformity with the international standard and JIS standard, an external connection terminal of an IC chip is formed on a front face of the card. Further, the external connection terminal is formed at a predetermined position with one end of a card in a short widthwise direction of the card and one end of the card in a longitudinal direction of the card as references. In addition, an embossing card which is formed with characters, digits or the like formed by embossing has been known. In an embossed card in conformity with the international standard and JIS standard, an embossing area where embossing is performed is determined and a predetermined area with the other end in a short widthwise direction of a card as a reference is determined as an embossing area. Further, a predetermined area except both end sides in a longitudinal direction of a card is determined as the embossing area. Characters, digits or the like which are formed in the embossing area by embossing are protruded to a side of a front face of the card.

PATENT LITERATURE

[PTL 1] Japanese Patent Laid-Open No. Hei 9-128872

Like a magnetic stripe reading/writing device described in Patent Literature 1, in a case that a card with a magnetic stripe in conformity with the international standard and JIS standard is to be processed in a device in which a magnetic medium is conveyed in a direction perpendicular to the direction of the magnetic stripe, the card is conveyed in its short widthwise direction. Further, as described above, in a card with a magnetic stripe in conformity with the international standard and JIS standard, the magnetic stripe is formed in a predetermined range with one end of the card in the short widthwise direction of the card as a reference. Therefore, when a card with a magnetic stripe in conformity with the international standard and JIS standard is to be processed in the device, positions of the magnetic head and the magnetic stripe may be displaced from each other when reading and writing of magnetic data are to be performed and, as a result, reading and writing accuracy of magnetic data may be lowered.

SUMMARY

In view of the problem described above, at least an embodiment of the present invention provides a card reader which is capable of suppressing lowering of reading accuracy and recording accuracy of magnetic data even when a card with a magnetic stripe in conformity with the international standard or JIS standard is conveyed in its short widthwise direction and is processed.

To achieve the above, at least an embodiment of the present invention provides a card reader for use with a card formed in a substantially rectangular shape which is conveyed in its short widthwise direction and is processed, includes a card conveying mechanism structured to convey the card, a conveying passage where the card is conveyed, a magnetic head which is capable of abutting a magnetic stripe formed on the card for performing at least one of reading of magnetic data recorded on the card and recording of magnetic data on the card, a head moving mechanism for moving the magnetic head in a widthwise direction of the conveying passage which is perpendicular to a conveying direction of the card, and an abutting part with which one end of the card in the conveying direction of the card is abutted. The card conveying mechanism includes a drive source, and a first conveying roller and a second conveying roller which convey the card until the one end of the card in the conveying direction of the card is abutted with the abutting part. The first conveying roller is disposed on one end side in the widthwise direction of the conveying passage so as to contact with a front face or a rear face on one end side in a longitudinal direction of the card, and the second conveying roller is disposed on the other end side in the widthwise direction of the conveying passage so as to contact with the front face or the rear face on the other end side in the longitudinal direction of the card. The card conveying mechanism includes a first torque limiter, which is disposed in a power transmission path from the drive source to the first conveying roller, and a second torque limiter which is disposed in a power transmission path from the drive source to the second conveying roller.

The card reader in accordance with at least an embodiment of the present invention includes a card conveying mechanism structured to convey the card and an abutting part with which one end of the card in the conveying direction of the card is abutted. Further, the card conveying mechanism includes a first conveying roller and a second conveying roller which convey the card until the one end of the card in the conveying direction of the card is abutted with the abutting part. Therefore, in this embodiment, in a card with a magnetic stripe in conformity with the international standard or JIS standard, the magnetic head is moved and reading and recording of magnetic data are performed in a state that one end in a short widthwise direction of the card which is the reference of a forming range of the magnetic stripe is abutted with the abutting part and thereby the card is positioned. Accordingly, in at least an embodiment of the present invention, even in a case that a card with a magnetic stripe in conformity with the international standard or JIS standard is conveyed in its short widthwise direction and is processed, when reading and recording of magnetic data are to be performed, aligning of the magnetic head with the magnetic stripe can be performed with a high degree of accuracy. As a result, lowering of reading accuracy and recording accuracy of magnetic data can be suppressed.

Further, in the card reader in accordance with at least an embodiment of the present invention, the first conveying roller is disposed on one end side in the widthwise direction of the conveying passage so as to contact with a front face or a rear face on one end side in a longitudinal direction of the card, and the second conveying roller is disposed on the other end side in the widthwise direction of the conveying passage so as to contact with the front face or the rear face on the other end side in the longitudinal direction of the card. Therefore, in at least an embodiment of the present invention, a card can be conveyed by the first conveying roller and the second conveying roller contacting with a front face or a rear face of the card on both end sides in a longitudinal direction of the card. Accordingly, in at least an embodiment of the present invention, a card can be conveyed so that a short widthwise direction of the card is not inclined with respect to the front and rear direction.

Further, in at least an embodiment of the present invention, a first torque limiter is disposed on the way of a power transmission path from the drive source to the first conveying roller, and a second torque limiter is disposed on the way of a power transmission path from the drive source to the second conveying roller. Therefore, in at least an embodiment of the present invention, even when one end of a card in a short widthwise direction of the card is abutted with the abutting part in a state that the short widthwise direction of the card is inclined with respect to a conveying direction of the card, the inclination of the short widthwise direction of the card with respect to the conveying direction of the card can be corrected by rotating only one of the first conveying roller and the second conveying roller. For example, in a case that, although one end in a short widthwise direction and one end side in a longitudinal direction of a card is abutted with the abutting part, the one end in the short widthwise direction and the other end side in the longitudinal direction of the card is not abutted with the abutting part, both end sides in the longitudinal direction on the one end in the short widthwise direction of the card can be abutted with the abutting parts by cutting off power transmission from the drive source to the first conveying roller through operation of the first torque limiter and by rotating only the second conveying roller and, as a result, the inclination of the short widthwise direction of the card with respect to the conveying direction of the card can be corrected. Therefore, in at least an embodiment of the present invention, inclination of a magnetic stripe of a card abutting with the abutting part with respect to a moving direction of the magnetic head can be restrained. As a result, in at least an embodiment of the present invention, even in a case that a card with a magnetic stripe in conformity with the international standard or JIS standard is conveyed in its short widthwise direction and is processed, lowering of reading accuracy and recording accuracy of magnetic data can be suppressed.

In at least an embodiment of the present invention, a card can be conveyed by the first conveying roller and the second conveying roller contacting with a front face or a rear face of the card on both end sides in a longitudinal direction of the card. Therefore, even when an embossed card in conformity with the international standard or JIS standard is conveyed, contacting of characters, digits and the like (embossed portion) formed by embossing with the first conveying roller and the second conveying roller can be prevented. Accordingly, a slip of a card or damage of the embossed portion which may be occurred by contacting of the first conveying roller and the second conveying roller with the embossed portion when the card is conveyed can be prevented.

In at least an embodiment of the present invention, for example, the card conveying mechanism includes a first rotation shaft, which holds the first conveying roller and is rotatable together with the first conveying roller, and a second rotation shaft which holds the second conveying roller and is rotatable together with the second conveying roller, and the first torque limiter is disposed between the first rotation shaft and the first conveying roller, and the second torque limiter is disposed between the second rotation shaft and the second conveying roller.

In at least an embodiment of the present invention, it is preferable that the card conveying mechanism includes a common motor as the drive source which is connected with the first conveying roller and the second conveying roller. According to this structure, the first conveying roller and the second conveying roller can be rotated by using one motor and thus a structure of the card reader can be simplified.

In at least an embodiment of the present invention, it is preferable that the card reader includes two abutting parts disposed with a predetermined distance therebetween in a widthwise direction of the conveying passage. According to this structure, since a card is capable abutting with two abutting parts, inclination of the short widthwise direction of the card with respect to the conveying direction of the card can be further reduced when the card is abutted with the two abutting parts.

In at least an embodiment of the present invention, it is preferable that the card reader includes two positioning members which are formed with the abutting part and are capable of turning with the widthwise direction of the conveying passage as an axial direction of turning, and two sensors for detecting respective movements of the two positioning members and, based on detected results of the two sensors, it is detected that the one end of the card in the conveying direction of the card is abutted with the two abutting parts and that the card has been positioned in the conveying direction of the card. In this case, it is preferable that the drive source is driven, based on detected results of the two sensors, until it is detected that the one end of the card in the conveying direction of the card is abutted with the two abutting parts and that the card has been positioned in the conveying direction of the card. According to this structure, the drive source is driven until the one end in the short widthwise direction of the card is abutted with the two abutting parts and thus the one end in the short widthwise direction of the card can be surely abutted with the two abutting parts. Therefore, inclination of a magnetic stripe of a card abutting with the abutting parts with respect to a moving direction of the magnetic head can be surely restrained.

In at least an embodiment of the present invention, it is preferable that the card reader includes an insertion port into which the card is inserted, one end of the conveying passage in the widthwise direction of the conveying passage is formed with an abutting face with which one end of the card in the longitudinal direction of the card is capable of abutting, the card conveying mechanism includes a third conveying roller and a fourth conveying roller which are disposed on a front side relative to the first conveying roller and the second conveying roller in a taking-in direction of the card, the third conveying roller is disposed on one end side in the widthwise direction of the conveying passage so as to contact with the front face or the rear face of the one end side in the longitudinal direction of the card and is disposed so that a substantially whole in a widthwise direction of the third conveying roller is contacted with the front face or the rear face of the card inserted into the insertion port, and the fourth conveying roller is disposed on the other end side in the widthwise direction of the conveying passage so as to contact with the front face or the rear face of the other end side in the longitudinal direction of the card and is disposed so that a part in a widthwise direction of the fourth conveying roller is contacted with the front face or the rear face of the card inserted into the insertion port. In this case, for example, the fourth conveying roller is disposed so that an approximately or substantially half in the widthwise direction of the fourth conveying roller is contacted with the front face or the rear face of the card inserted into the insertion port.

Further, in at least an embodiment of the present invention, the card reader may include an insertion port into which the card is inserted, one end of the conveying passage in the widthwise direction of the conveying passage is formed with an abutting face with which one end of the card in the longitudinal direction of the card is capable of abutting, the card conveying mechanism includes a third conveying roller and a fourth conveying roller which are disposed on a front side relative to the first conveying roller and the second conveying roller in a taking-in direction of the card, the third conveying roller is disposed on one end side in the widthwise direction of the conveying passage so as to contact with the front face or the rear face of the one end side in the longitudinal direction of the card, the fourth conveying roller is disposed on the other side in the widthwise direction of the conveying passage so as to contact with the front face or the rear face of the other end side in the longitudinal direction of the card, and an outer diameter of the third conveying roller is gradually reduced from the one end side toward the other end side in the widthwise direction of the conveying passage.

Further, in at least an embodiment of the present invention, the card reader may include an insertion port into which the card is inserted, one end of the conveying passage in the widthwise direction of the conveying passage is formed with an abutting face with which one end of the card in the longitudinal direction of the card is capable of abutting, the card conveying mechanism includes a third conveying roller and a fourth conveying roller which are disposed on a front side relative to the first conveying roller and the second conveying roller in a taking-in direction of the card, the third conveying roller is disposed on one end side in the widthwise direction of the conveying passage so as to contact with the front face or the rear face of the one end side in the longitudinal direction of the card, the fourth conveying roller is disposed on the other side in the widthwise direction of the conveying passage so as to contact with the front face or the rear face of the other end side in the longitudinal direction of the card, and an outer diameter of the fourth conveying roller is gradually reduced from the one end side toward the other end side in the widthwise direction of the conveying passage.

Further, in these cases, the card reader includes, for example, an IC contact spring structured to contact with an external connection terminal of an IC chip formed on the card, and the IC contact spring is disposed on the one end side in the widthwise direction of the conveying passage.

According to this structure, a card can be shifted toward the abutting face side while conveying the card inserted into the insertion port by the third conveying roller and the fourth conveying roller with a simple structure and, as a result, when one end in the short widthwise direction of the card is abutted with the abutting part, one end in a longitudinal direction of the card can be abutted with the abutting face. Therefore, when recording of magnetic data is to be performed by the magnetic head, accuracy of recording position of magnetic data in the longitudinal direction of the card can be secured. Further, in a case that the IC contact springs are to be contacted with external connection terminals of a card, the IC contact springs can be contacted with the external connection terminals which are formed at predetermined positions with the one end in the short widthwise direction of the card and the one end in the longitudinal direction of the card as references with a high degree of accuracy.

As described above, in the card reader in accordance with at least an embodiment of the present invention, even in a case that a card with a magnetic stripe in conformity with the international standard or JIS standard is conveyed in its short widthwise direction and is processed, lowering of reading accuracy and recording accuracy of magnetic data can be suppressed.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 11 is a top plan view for explaining a structure of a conveying passage and a card conveying mechanism shown in FIG. 2.

FIGS. 12(A) and 12(B) are views for explaining operation of torque limiters shown in FIG. 11.

DESCRIPTION OF EMBODIMENTS

Embodiments of the present invention will be described below with reference to the accompanying drawings.

(Schematic Structure of Card Reader)

Figure 1:
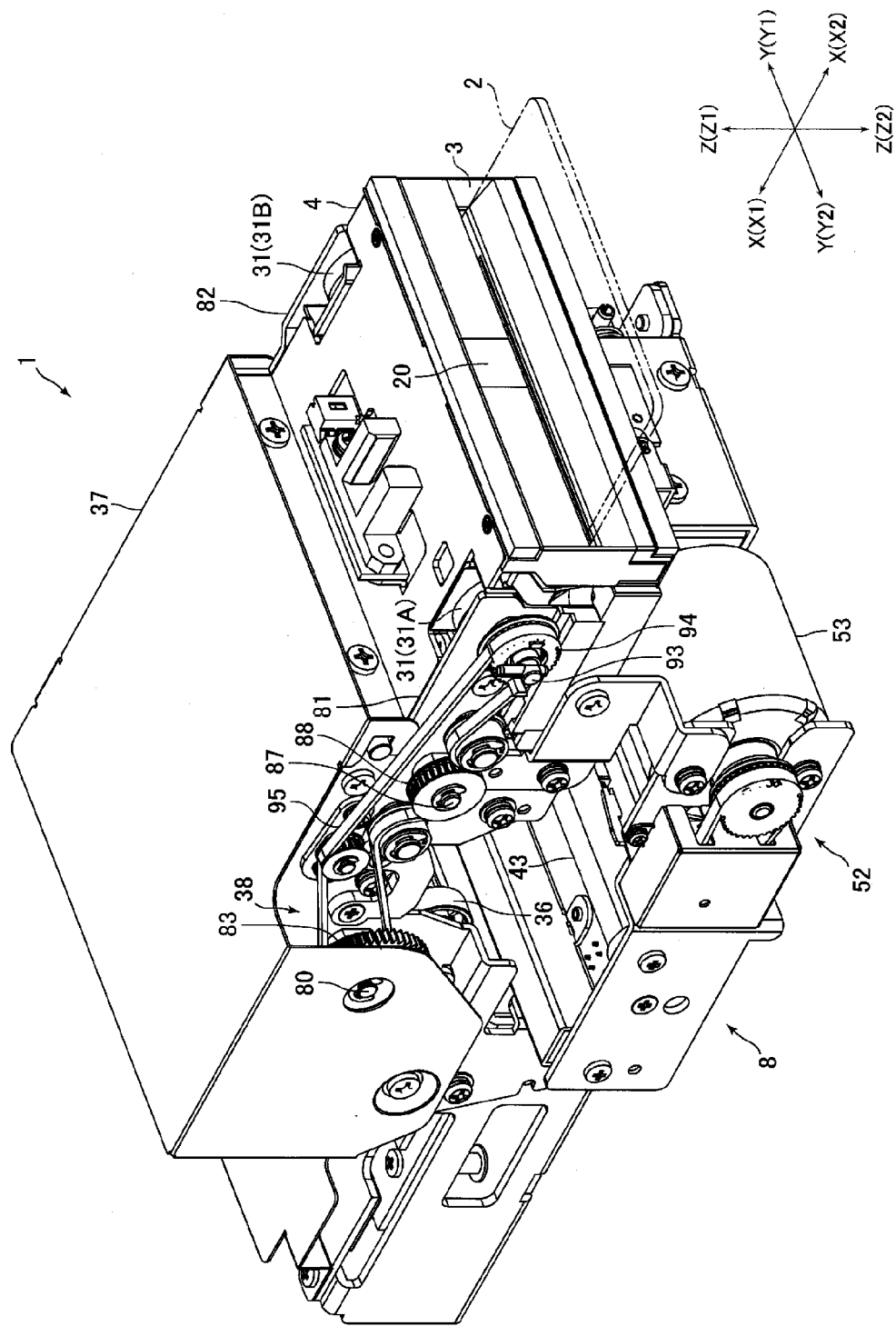
FIG. 1 is a perspective view showing a card reader in accordance with an embodiment of the present invention.
Figure 2:
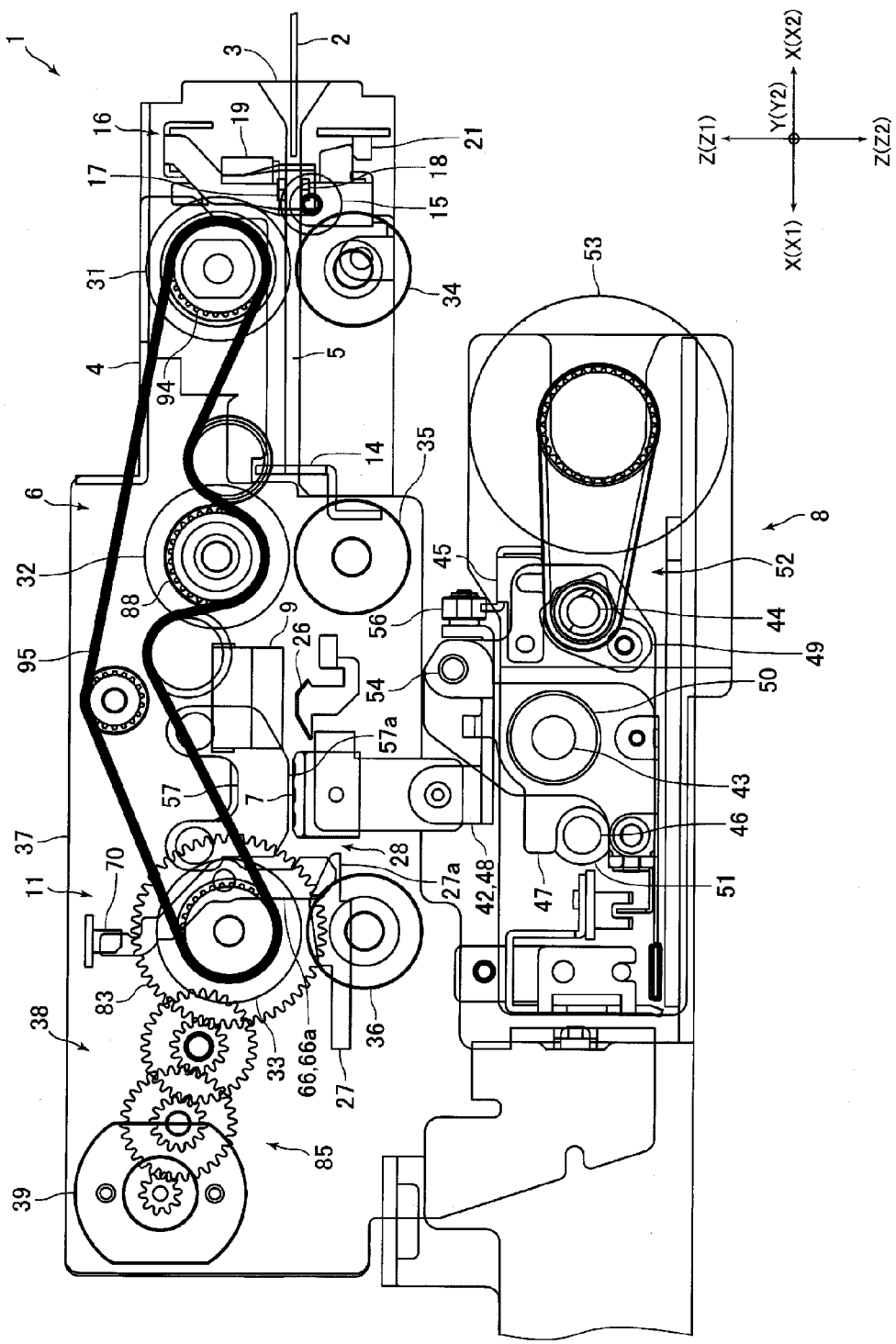
FIG. 2 is a side view for explaining a schematic structure of the card reader shown in FIG. 1.
Figure 3:
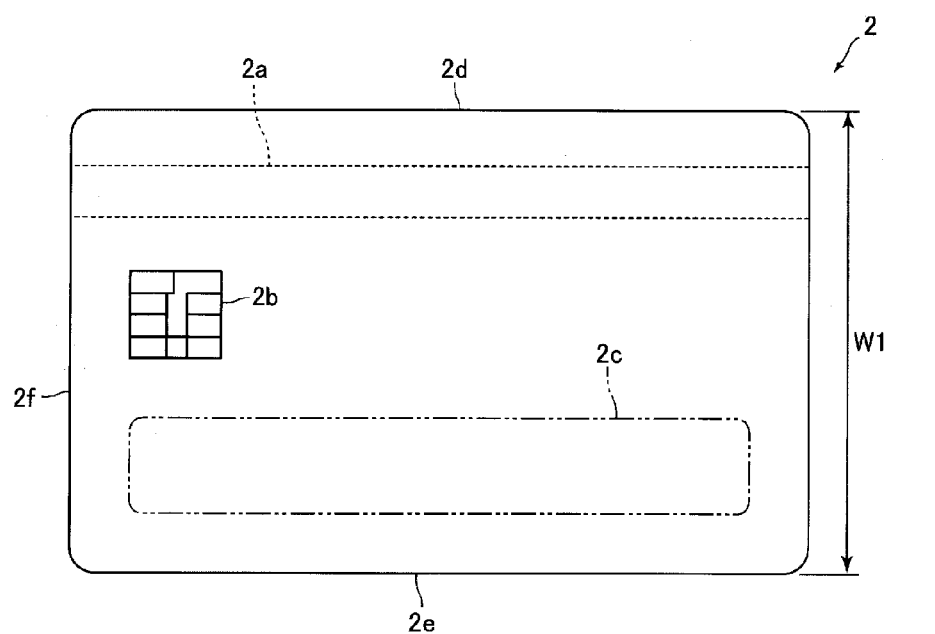
FIG. 3 is a plan view showing a card in FIG. 1.

FIG. 1 is a perspective view showing a card reader 1 in accordance with an embodiment of the present invention. FIG. 2 is a side view for explaining a schematic structure of the card reader 1 shown in FIG. 1. FIG. 3 is a plan view showing a card 2 in FIG. 1.

The card reader 1 in this embodiment is a device for performing at least one of reading of magnetic data recorded on a card 2 and recording of magnetic data to a card 2, and the card reader 1 is mounted and used in a predetermined host device such as an ATM (Automated Teller Machine). The card reader 1 includes a card insertion part 4 formed with an insertion port 3 into which a card 2 is inserted. As shown in FIG. 2, a conveying passage 5 where a card 2 is conveyed is formed in an inside of the card reader 1. The conveying passage 5 is formed so as to be connected with the insertion port 3.

Figure 6A:
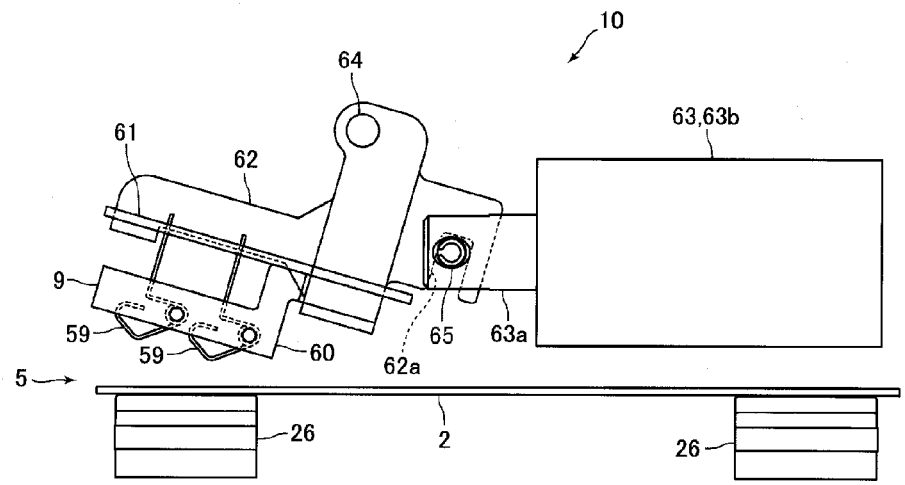
FIGS. 6(A) and 6(B) are front views for explaining a contact block moving mechanism which drives an IC contact block shown in FIG. 2.
Figure 6B:
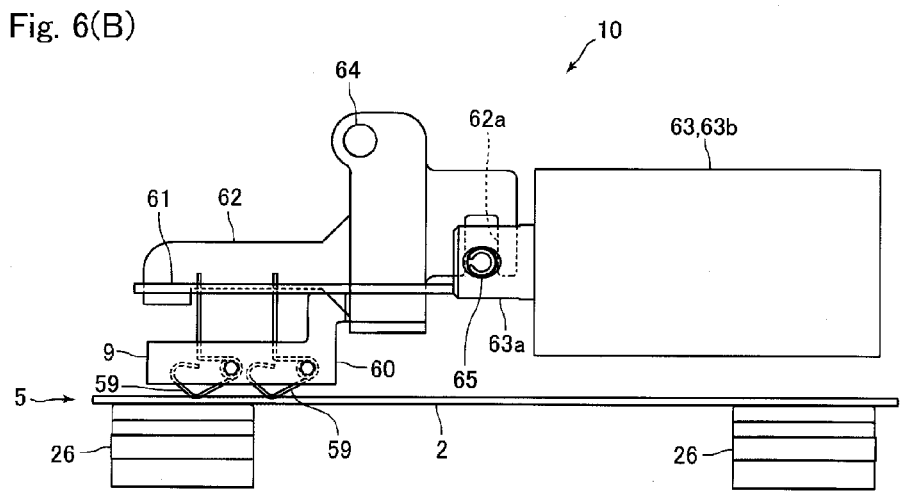
Figure 6B:
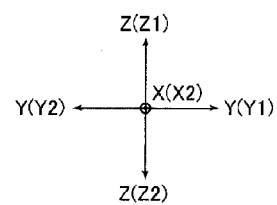

Further, the card reader 1 includes a card conveying mechanism 6 for conveying a card 2, a magnetic head 7 which is structured to abut with the card 2 and to perform reading of magnetic data recorded on the card 2 and recording of magnetic data to the card 2, a head moving mechanism 8 which is structured to move the magnetic head 7 in a direction perpendicular to a conveying direction of the card 2, an IC contact block 9 which is structured to contact with a terminal part 2b described below formed on the card 2 to exchange data, a contact block moving mechanism 10 (see FIGS. 6(A) and 6(B)) for moving the IC contact block 9, and a positioning mechanism 11 for positioning the card 2 having been taken into the card reader 1.

A card 2 is that made of vinyl chloride whose thickness is about 0.7-0.8 mm. A card 2 in this embodiment is an embossed card with a magnetic stripe in conformity with the international standard (for example, ISO/IEC 7811) or JIS standard (for example, JISX 6302) and is formed in a substantially rectangular shape whose four corners are rounded. A rear face of a card 2 is formed with a magnetic stripe 2a in which magnetic data are recorded. Further, the card 2 is a contact type IC card. In other words, the card 2 has a built-in IC chip and a front face of the card 2 is formed with a terminal part 2b comprised of eight external connection terminals. A part of the card 2 is formed with an embossing area 2c where embossing is performed. In other words, the card 2 is defined with an embossing area 2c where embossing is performed.

The magnetic stripe 2a is formed in a long and thin strip shape which is parallel to a longitudinal direction ("U" direction in FIG. 3) of the card 2 formed in a substantially rectangular shape. The magnetic stripe 2a is formed over the entire region in the longitudinal direction of the card 2. Further, the magnetic stripe 2a is formed on one end 2d side in the short widthwise direction ("V" direction in FIG. 3) of the card 2. Specifically, the magnetic stripe 2a is formed within a predetermined region with the one end 2d of the card 2 as a reference in the short widthwise direction of the card 2 based on the international standard or JIS standard.

The terminal part 2b is formed on one end side in the longitudinal direction of the card 2 and at a roughly center position in the short widthwise direction of the card 2. Eight external connection terminals which structure the terminal part 2b are arranged in four lines in the short widthwise direction of the card 2 and in two rows in the longitudinal direction of the card 2. Further, eight external connection terminals are, based on the international standard or JIS standard, formed at a predetermined position with one end 2d of a card 2 in the short widthwise direction of the card 2 and one end 2f of the card 2 in the longitudinal direction of the card 2 as references.

The embossing area 2c is disposed on the other end 2e side in the short widthwise direction of the card 2. Specifically, based on the international standard or JIS standard, a predetermined area with the other end 2e in the short widthwise direction of a card 2 as a reference is determined as the embossing area 2c. Further, the embossing area 2c is formed in a predetermined area except both end sides in the longitudinal direction of the card 2. Characters, digits or the like (embossed portion) which are formed in the embossing area 2c by embossing are protruded to a side of a front face of a card.

In this embodiment, a card 2 is conveyed in an "X" direction which is shown in FIG. 1 and the like. Specifically, a card 2 is taken in an "X1" direction and the card 2 is ejected in an "X2" direction. In other words, the "X" direction is a conveyance direction of a card 2, the "X1" direction is a taking-in direction of the card 2, and the "X2" direction is an ejecting direction of the card 2. Further, in this embodiment, a card 2 is taken into the card reader 1 so that the short widthwise direction of the card 2 is coincided with the "X" direction. Further, the card 2 is conveyed in the card reader 1 so that the short widthwise direction of the card 2 is coincided with the "X" direction. In other words, the card reader 1 conveys a card 2 in the short widthwise direction of the card 2 to perform predetermined processing.

Further, the "Y" direction which is perpendicular to the "X" direction is a widthwise direction of the conveying passage 5 and is a longitudinal direction of a card 2 which is taken into the card reader 1 in a correct posture. Further, a "Z" direction in FIG. 1 and the like perpendicular to the "X" direction and the "Y" direction is a height direction of the conveying passage 5 and is a thickness direction of a card 2 taken into the card reader 1. In this embodiment, the card reader 1 is disposed so that the "Z" direction and the vertical direction are coincided with each other. In the following descriptions, the "X" direction is referred to as a "front and rear direction", the "Y" direction is referred to as a "right and left direction" and the "Z" direction is referred to as an "upper and lower direction". Further, the "X1" direction side is referred to as a "rear" (back) side, the "X2" direction side is referred to as a "front" side, the "Y1" direction side is a "right" side, the "Y2" direction side is a "left" side, the "Z1" direction side is an "upper" side, and the "Z2" direction side is a "lower" side.

(Structure of Card Insertion Part)

The card insertion part 4 structures a front face side portion of the card reader 1. The card insertion part 4 includes shutter members 14 and 15 disposed on a back side relative to the insertion port 3, an insertion detection mechanism 16 for detecting a card 2 having been inserted into the card reader 1 (in other words, a card 2 having been inserted into the insertion port 3) so that the short widthwise direction of the card 2 is coincided with the front and rear direction, magnetic sensors 17 and 18 for detecting that magnetic data are recorded in the card 2, a metal sensor 19 for detecting that external connection terminals of an IC chip are fixed to the card 2 (in other words, the terminal part 2b is fixed), and a human body detecting infrared sensor 20 for detecting a human motion ahead of the card reader 1.

The shutter member 14 is disposed at a rear end of the card insertion part 4. The shutter member 14 is movable between a closed position where the shutter member 14 is disposed in the conveying passage 5 to close the conveying passage 5 and an open position where the shutter member 14 is retreated to a lower side relative to the conveying passage 5 to open the conveying passage 5. The shutter member 14 is connected with a drive mechanism for the shutter member 14 having a solenoid and the like.

The shutter member 15 is disposed on a front side relative to the shutter member 14. The shutter member 15 in this embodiment is a rotatable roller with the right and left direction as an axial direction of rotation. The shutter member 15 is movable between a closed position where the shutter member 15 is disposed in the conveying passage 5 to close the conveying passage 5 and an open position where the shutter member 15 is retreated to a lower side relative to the conveying passage 5 to open the conveying passage 5. The shutter member 15 in this embodiment is urged to the closed position by an urging member not shown and, when a card 2 inserted into the insertion port 3 is contacted with the shutter member 15, the shutter member 15 is moved to the open position. Further, the card insertion part 4 includes a sensor 21 for detecting that the shutter member 15 is moved to the open position.

The insertion detection mechanism 16 is disposed at substantially the same position as the shutter member 15 in the front and rear direction. The insertion detection mechanism 16 includes two detection levers which are disposed on both end sides in the right and left direction of the card insertion part 4 and is capable of protruding to and retreating from the conveying passage 5, and two sensors for detecting respective movements of the two detection levers. In a standby state before a card 2 is inserted into the card reader 1, parts of the detection levers are disposed within the conveying passage 5. In this state, when a card 2 is inserted into the insertion port 3 so that the short widthwise direction of the card 2 is coincided with the front and rear direction, both ends on the right and left sides of the card 2 are respectively contacted with two detection levers and the detection levers are turned. Therefore, based on detected results of the two sensors, it is detected that the card 2 has been inserted into the insertion port 3 so that the short widthwise direction of the card 2 is coincided with the front and rear direction.

The magnetic sensors 17 and 18 are, for example, flux gate sensors. Each of the magnetic sensors 17 and 18 outputs an output signal having a level depending on a distance from a magnetic body. Further, the magnetic sensors 17 and 18 are disposed so as to interpose the card 2 inserted into the insertion port 3 in the upper and lower direction. In this embodiment, when a card 2 is inserted into the insertion port 3 so that the short widthwise direction of the card 2 is coincided with the front and rear direction in a state that a rear face of the card 2 faces a lower side, a level of an output signal outputted from the magnetic sensor 18 becomes higher than a level of an output signal outputted from the magnetic sensor 17. On the other hand, when a card 2 is inserted into the insertion port 3 so that the short widthwise direction of the card 2 is coincided with the front and rear direction in a state that a front face of the card 2 faces a lower side, a level of an output signal outputted from the magnetic sensor 17 becomes higher than a level of an output signal outputted from the magnetic sensor 18. Therefore, when a level of an output signal from the magnetic sensor 17 and a level of an output signal from the magnetic sensor 18 are compared with each other, it is detected whether a card 2 is inserted into the insertion port 3 in a state that its rear face faces a lower side or, whether a card 2 is inserted into the insertion port 3 in a state that its front face faces a lower side.

The metal sensor 19 is a magnetic type sensor which includes an excitation coil, a detection coil and a core around which the excitation coil and the detection coil are wound. The metal sensor 19 is disposed on a slightly front side relative to the magnetic sensors 17 and 18 in the front and rear direction. Further, the metal sensor 19 is disposed in the right and left direction at a position where the terminal part 2b of a card 2 inserted in a correct posture is passed. In this embodiment, when a card 2 is inserted from one end 2d side in the short widthwise direction of the card 2 in a state that its rear face faces a lower side, the terminal part 2b of the card 2 is detected by the metal sensor 19. Further, even when a card 2 is inserted from the other end 2e side in the short widthwise direction of the card 2 in a state that its front face faces a lower side, the terminal part 2b of the card 2 is detected by the metal sensor 19. Therefore, based on detected results of the magnetic sensors 17 and 18 and a detected result of the metal sensor 19, it is detected whether the card 2 is inserted from the one end 2d side of the card 2 or, whether the card 2 is inserted from the other end 2e side of the card 2.

The infrared sensor 20 is a pyroelectric type infrared sensor and includes a pyroelectric element for detecting light including infrared rays by pyroelectric effect. As described above, the infrared sensor 20 detects a human motion ahead of the card reader 1. Specifically, the infrared sensor 20 detects a motion of a human hand or the like ahead of the card reader 1. Further, based on the infrared rays generated by a human being ahead of the card reader 1, the infrared sensor 20 detects a difference or the like between a body temperature of the human being ahead of the card reader 1 and an ambient temperature of the human being in a detecting range of the infrared sensor 20 and thereby motion of the human being ahead of the card reader 1 is detected. As shown in FIG. 1, the infrared sensor 20 is disposed on the front face side of the card insertion part 4.

(Schematic Structure of Card Conveying Mechanism and Schematic Structure of Conveying Passage)

The conveying passage 5 is formed in a substantially entire region of the card reader 1 in the front and rear direction. The card conveying mechanism 6 includes conveying rollers 31 through 33 structured to abut with an upper face of a card 2 for conveying the card 2, and pad rollers 34 through 36 which are oppositely disposed to the conveying rollers 31 through 33 from a lower side. The conveying rollers 31 through 33 are rubber rollers whose surface is formed of rubber. On the other hand, the pad rollers 34 through 36 are resin rollers whose surface is formed of resin. The conveying roller 31, the conveying roller 32 and the conveying roller 33 are formed in the same shape as each other and their outer diameters and widths are equal to each other. Further, the pad roller 34, the pad roller 35 and the pad roller 36 are formed in the same shape as each other and their outer diameters and widths are equal to each other.

The conveying roller 31 is disposed in an inside of the card insertion part 4. Specifically, the conveying roller 31 is disposed on the front side relative to the shutter member 14. The conveying rollers 32 and 33 are disposed in an inside of a main body part 37 of the card reader 1 which is disposed on a rear side with respect to the card insertion part 4. Specifically, the conveying roller 32 is disposed on a front side relative to the magnetic head 7 and an IC contact block 9 in the front and rear direction and is disposed on a rear side relative to the shutter member 14. Further, the conveying roller 33 is disposed on a rear side relative to the magnetic head 7 and is disposed on a rear side relative to an abutting part 66a of a positioning member 66 described below which structures a positioning mechanism 11. The conveying rollers 31 through 33 are connected with a motor 39 through a power transmission mechanism 38 which is structured of a belt, pulleys, a gear train and the like.

The pad roller 34 is urged toward the conveying roller 31 and is capable of abutting with a card 2 from a lower side. The pad roller 35 is urged toward the conveying roller 32 and is capable of abutting with a card 2 from a lower side. The pad roller 36 is urged toward the conveying roller 33 and is capable of abutting with a card 2 from a lower side. In accordance with an embodiment of the present invention, it may be structured that the conveying rollers 31 through 33 are abutted with an under face of a card 2 and the pad rollers 34 through 36 are oppositely disposed to the conveying rollers 31 through 33 on an upper side.

Guide members 26 and 27 for guiding an under face of a card 2 are disposed in an inside of the main body part 37. The guide members 26 and 27 are fixed to a frame of the main body part 37 of the card reader 1. As described below, the magnetic head 7 is disposed between the conveying roller 32 and the pad roller 35 and the conveying roller 33 and the pad roller 36 in the front and rear direction, and the guide member 26 is disposed between the conveying roller 32 and the pad roller 35 and the magnetic head 7 in the front and rear direction. Further, the guide member 27 is disposed on a rear side relative to the magnetic head 7 in the front and rear direction and is disposed at substantially the same position as the positioning mechanism 11.

In this embodiment, two guide members 26 are respectively disposed on both end sides in the right and left direction of the conveying passage 5 (see FIGS. 6(A) and 6(B)). Further, the guide member 27 is provided with two guide parts 27a which are separately disposed with a predetermined space therebetween in the right and left direction. An upper face of the guide member 26 and an upper face of the guide part 27a structure a part of a lower face of the conveying passage 5. An opening part 28 is formed in the lower face of the conveying passage 5 between the guide member 26 and the guide part 27a. In other words, the conveying passage 5 is formed with the opening part 28. The opening part 28 is formed over a substantially entire region of the conveying passage 5 in the right and left direction.

A further specific structure of the card conveying mechanism 6 and the conveying passage 5 will be described below.
(Structure of Head Moving Mechanism and Structure of Portion Surrounding Magnetic Head)

Figure 4:
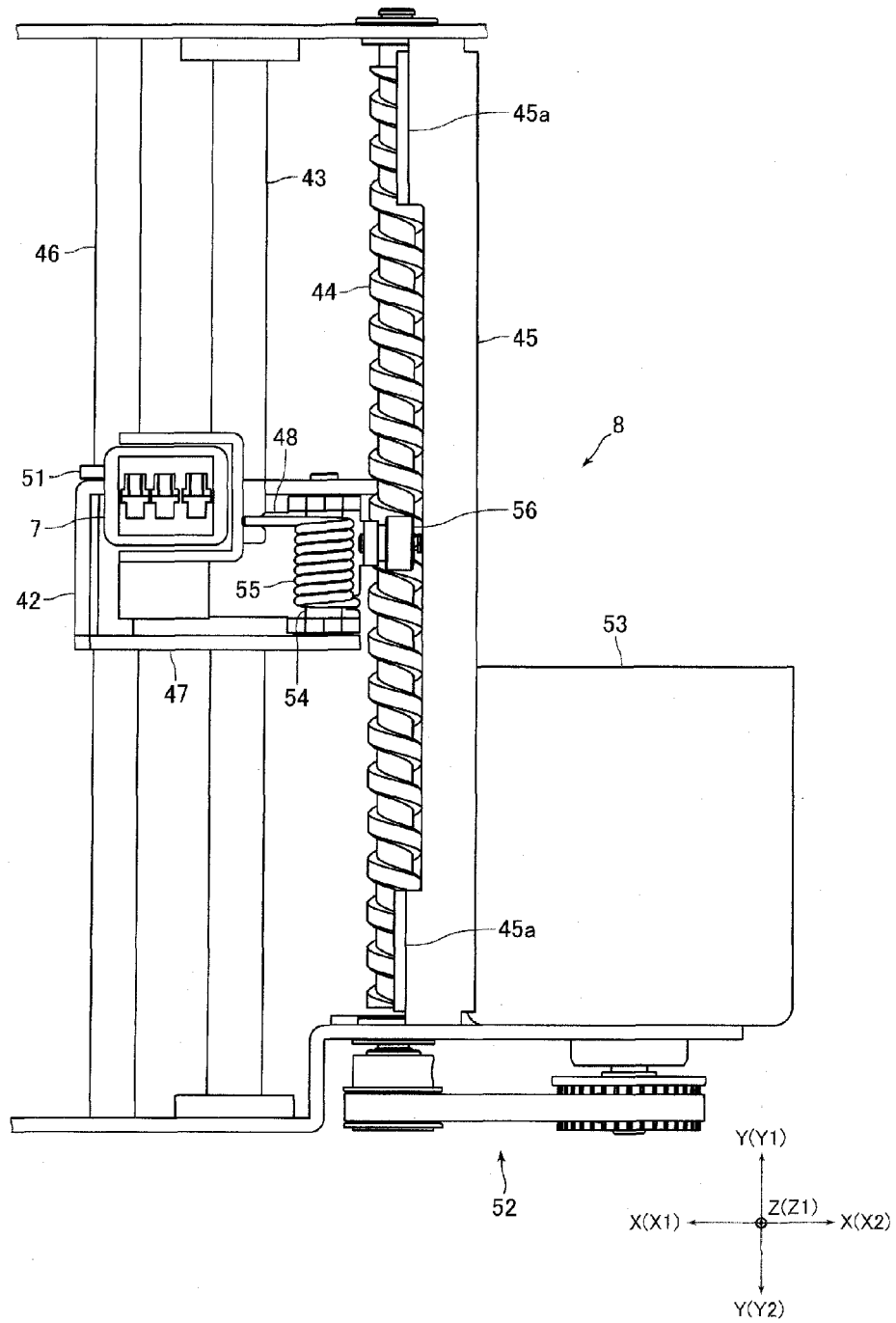
FIG. 4 is a top plan view for explaining a structure of a head moving mechanism shown in FIG. 2.
Figure 5:
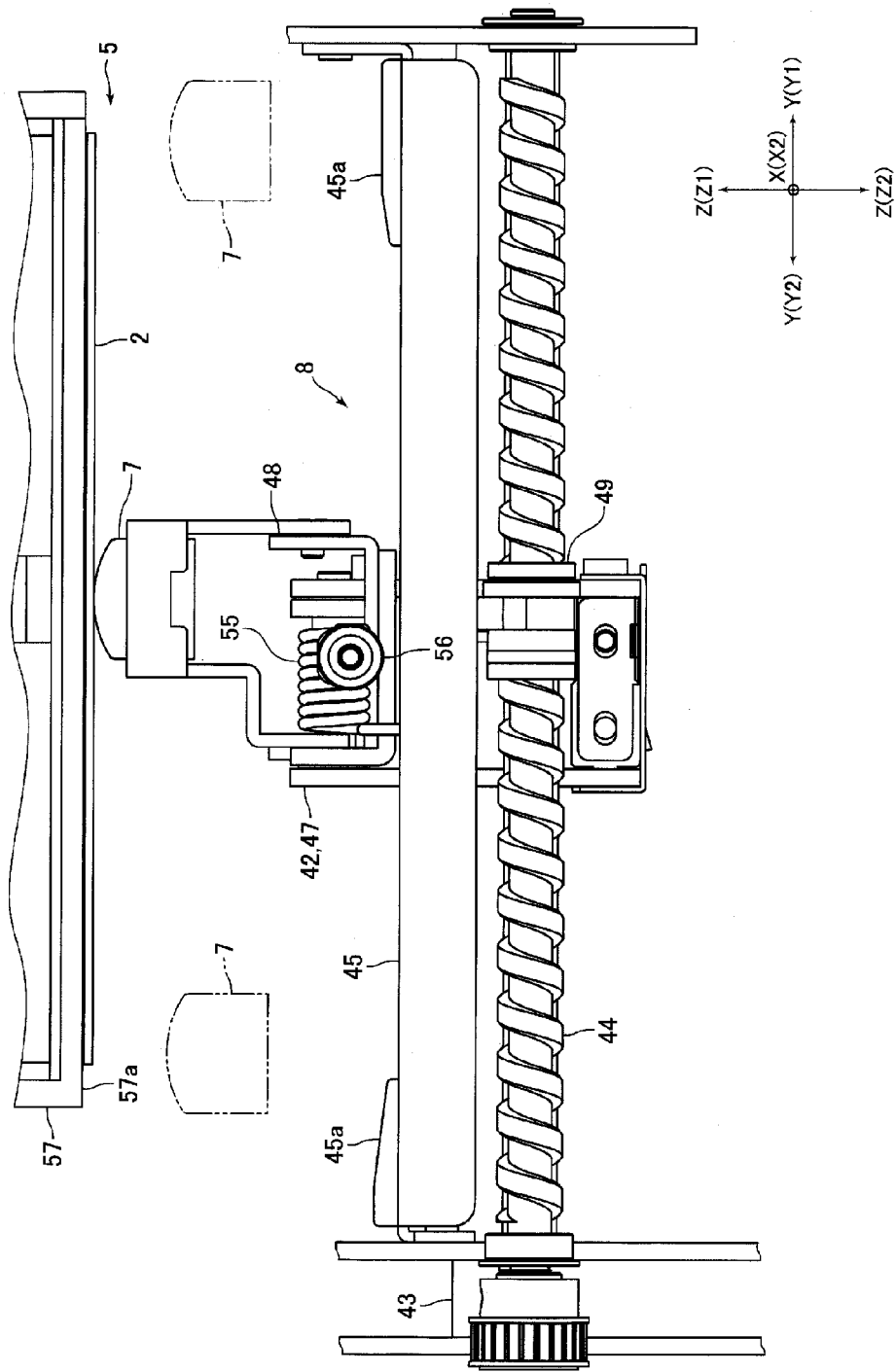
FIG. 5 is a front view for explaining the structure of the head moving mechanism shown in FIG. 2.

FIG. 4 is a top plan view for explaining a structure of a head moving mechanism 8 shown in FIG. 2. FIG. 5 is a front view for explaining the structure of the head moving mechanism 8 shown in FIG. 2.

The magnetic head 7 is disposed between the conveying roller 32 and the pad roller 35 and the conveying roller 33 and the pad roller 36 in the front and rear direction. The head moving mechanism 8 includes a carriage 42 on which the magnetic head 7 is mounted, a guide shaft 43 for guiding the carriage 42 in the right and left direction, a lead screw 44 for moving the carriage 42 in the right and left direction, a cam plate 45 for moving the magnetic head 7 up and down, and a turning prevention shaft 46 for preventing turning of the carriage 42 around the guide shaft 43. The carriage 42 includes a carriage main body 47 and a head holding member 48 which holds the magnetic head 7. The carriage main body 47 is attached with a female screw member 49 engaged with the lead screw 44, a slide bearing 50 engaged with the guide shaft 43, and a slide member 51 engaged with the turning prevention shaft 46. The lead screw 44 is connected with a motor 53 through a power transmission mechanism 52 structured of pulleys and a belt.

The carriage main body 47 is fixed with a fixed shaft 54, which turnably holds the head holding member 48, with the right and left direction as an axial direction. A torsion coil spring 55 is disposed between the carriage main body 47 and the head holding member 48 and the head holding member 48 is urged by an urging force of the torsion coil spring 55 so that the magnetic head 7 is moved upward with the fixed shaft 54 as a center. The cam plate 45 is formed in a long and thin elongated shape in the right and left direction and the head holding member 48 is rotatably attached with a roller 56 which is capable of abutting with cams 45a formed on both end sides in the right and left direction of the cam plate 45.

In this embodiment, when the motor 53 is driven and the lead screw 44 is rotated, the magnetic head 7 is moved in the right and left direction together with the carriage 42 along the guide shaft 43. The roller 56 is abutted with the cam 45a on both end sides in the right and left direction and, as shown by the two-dot chain line in FIG. 5, the magnetic head 7 is retreated to a lower side relative to the conveying passage 5 against an urging force of the torsion coil spring 55. In other words, the magnetic head 7 which is to be moved in the right and left direction is located at a head retreated position where the magnetic head 7 is retreated to a lower side from the conveying passage 5 on both end sides in the right and left direction.

On the other hand, the magnetic head 7 is moved in the right and left direction together with the carriage 42 and, when the roller 56 is disengaged from the cam 45a, the magnetic head 7 which is guided so as to be retreated to a lower side relative to the conveying passage 5 by the cam 45a is moved upward by the urging force of the torsion coil spring 55 and thereby the magnetic head 7 is capable of abutting with a magnetic stripe 2a of a card 2. In other words, when the roller 56 is disengaged from the cam 45a, the magnetic head 7 is located at a head abutting position where the magnetic head 7 is capable of abutting with a magnetic stripe 2a. When the carriage 42 is moved in the right and left direction while the magnetic head 7 is abutted with a magnetic stripe 2a, reading and recording of magnetic data are performed by the magnetic head 7. Further, when the magnetic head 7 is moved in the right and left direction, the magnetic head 7 is passed through the opening part 28.

As described above, the head moving mechanism 8 moves the magnetic head 7 in the right and left direction and moves the magnetic head 7 between a head abutting position where the magnetic head 7 is capable of abutting with a magnetic stripe 2a and a head retreated position where the magnetic head 7 is retreated from the conveying passage 5. In this embodiment, the magnetic head 7 is connected with a control circuit board of the card reader 1 through a predetermined cable.

An opposite member 57 which is formed with an opposed face 57a for abutting the magnetic head 7 located at the head abutting position with a card 2 at a predetermined abutting pressure is disposed on an upper side with respect to the magnetic head 7. The opposite member 57 is fixed to a frame of the main body part 37 of the card reader 1 and is disposed on an upper side with respect to the conveying passage 5. The opposed face 57a is formed in a flat face shape which is perpendicular to the upper and lower direction. Further, the opposed face 57a is formed in a substantially rectangular long and thin flat shape in the right and left direction. A width of the opposed face 57a in the right and left direction is substantially equal to the moving range of the magnetic head 7 in the right and left direction. Further, a width of the opposed face 57a in the front and rear direction is substantially equal to a width of the magnetic head 7 in the front and rear direction.

When the magnetic head 7 is located at the head abutting position, as shown in FIG. 5, a card 2 is sandwiched between the opposed face 57a and the magnetic head 7. In this case, the magnetic head 7 is abutted with a magnetic stripe 2a of a card 2 inserted in a correct posture at a predetermined abutting pressure and an upper face of the card 2 (specifically, a front face of the card 2) is abutted with the opposed face 57a at a predetermined abutting pressure.

(Structure of IC Contact Block and Structure of Contact Block Moving Mechanism)

FIGS. 6(A) and 6(B) are front views for explaining a contact block moving mechanism 10 which drives an IC contact block 9 shown in FIG. 2.

The IC contact block 9 includes, as shown in FIGS. 6(A) and 6(B), a plurality of IC contact springs 59 structured to respectively contact with a plurality of external connection terminals structuring the terminal part 2b of a card 2, a spring holding member 60 holding the IC contact springs 59, and a circuit board 61 connected with the IC contact springs 59. The circuit board 61 is fixed to the spring holding member 60. The IC contact block 9 is disposed between the conveying roller 32 and the pad roller 35 and the magnetic head 7 in the front and rear direction. Further, the IC contact block 9 is disposed on a left end side in the right and left direction of the conveying passage 5. In other words, the IC contact springs 59 are disposed on the left end side of the conveying passage 5. In addition, the IC contact block 9 is disposed on an upper side with respect to the conveying passage 5. The guide member 26 on a left end side of two guide members 26 is disposed on a lower side with respect to the IC contact block 9.

The contact block moving mechanism 10 includes a block holding member 62 to which the IC contact block 9 is fixed and a solenoid 63. The block holding member 62 is turnably held by a fixed shaft 64 which is fixed to a frame of the main body part 37 with the front and rear direction as an axial direction. A fixed pin 65 is fixed to a plunger 63a of the solenoid 63. The fixed pin 65 is engaged with an engaging groove 62a formed in the block holding member 62. The solenoid 63 is disposed so that the plunger 63a is moved in the right and left direction. A compression coil spring not shown is disposed between the main body 63b of the solenoid 63 and the plunger 63a and the plunger 63a is urged in a protruding direction from the main body 63b by an urging force of the compression coil spring.

When the plunger 63a is protruded from the main body 63b by an urging force of the compression coil spring, as shown in FIG. 6(A), the IC contact block 9 is retreated to an upper side with respect to the conveying passage 5. In other words, in this case, the IC contact block 9 is located at a spring retreated position where the IC contact springs 59 are retreated from the conveying passage 5. In this state, when the solenoid 63 is driven, the plunger 63a is pulled to the main body 63b side against the urging force of the compression coil spring and, as shown in FIG. 6(B), the IC contact block 9 is moved downward. When the IC contact block 9 is moved downward, the IC contact springs 59 are set to be capable of contacting with the external connection terminals which structure the terminal part 2b. In other words, when the solenoid 63 is driven and the plunger 63a is pulled to the main body 63b side, the IC contact block 9 is located at the spring contact position where the IC contact springs 59 are capable of contacting with the external connection terminals. As described above, the contact block moving mechanism 10 moves the IC contact block 9 between the spring contact position where the IC contact springs 59 are capable of contacting with the external connection terminals and the spring retreated position where the IC contact springs 59 are retreated from the conveying passage 5.

(Structure of Positioning Mechanism)

Figure 7A:
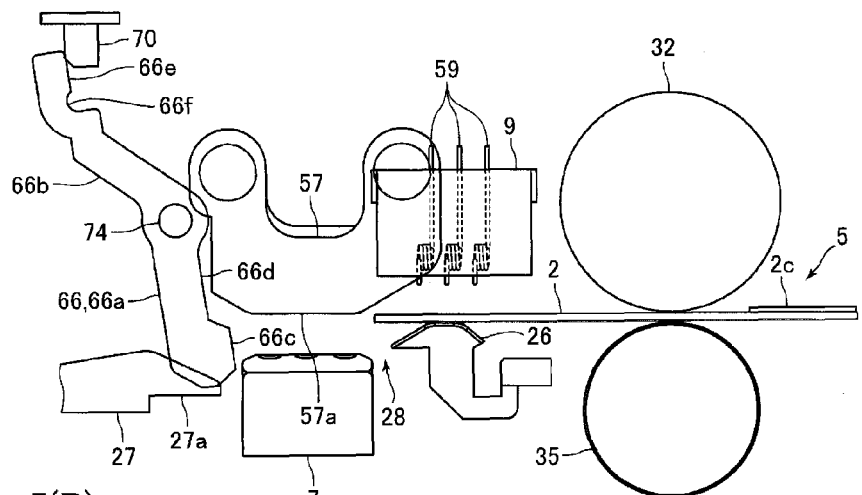
FIGS. 7(A) and 7(B) are side views for explaining a structure of a positioning member of a positioning mechanism and its surrounding portion shown in FIG. 2.
Figure 7B:
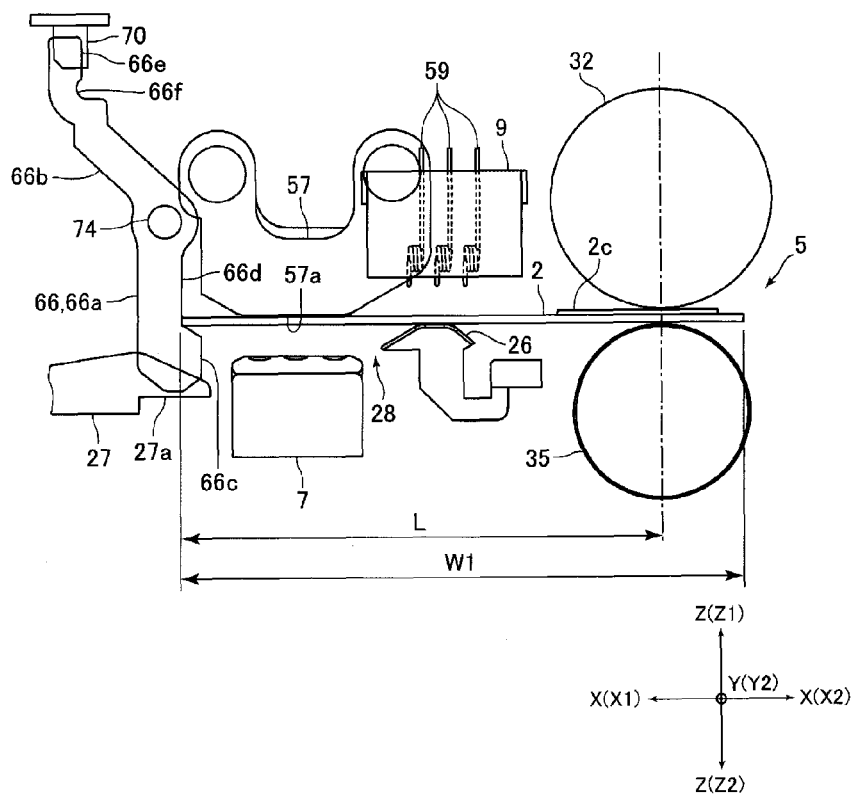
Figure 8A:
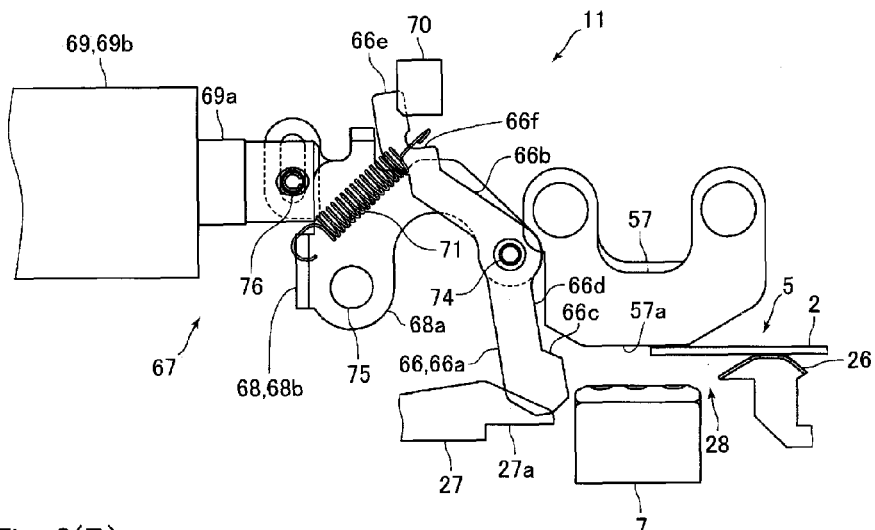
FIGS. 8(A) and 8(B) are side views for explaining a structure of a positioning mechanism and its surrounding portion shown in FIG. 2.
Figure 8B:
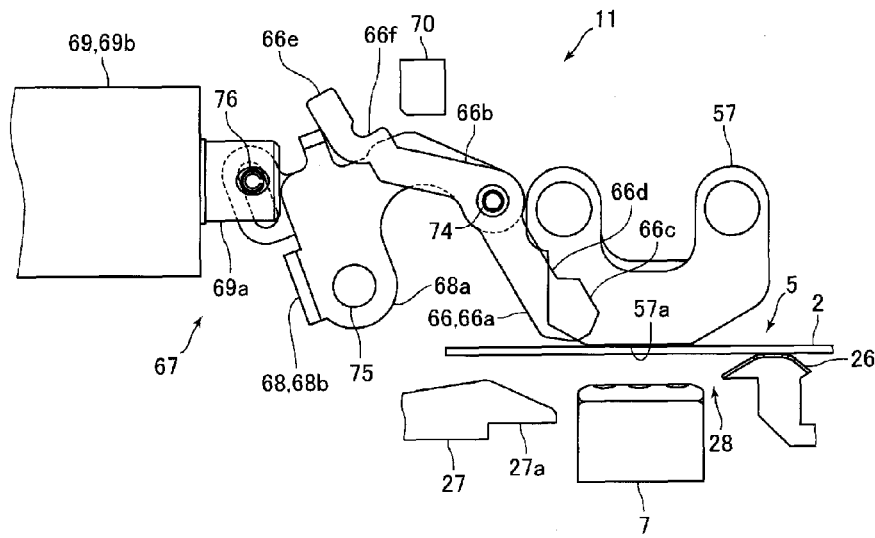
Figure 8B:
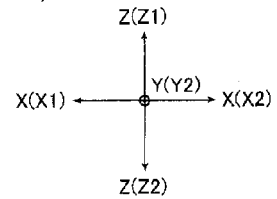
Figure 9:
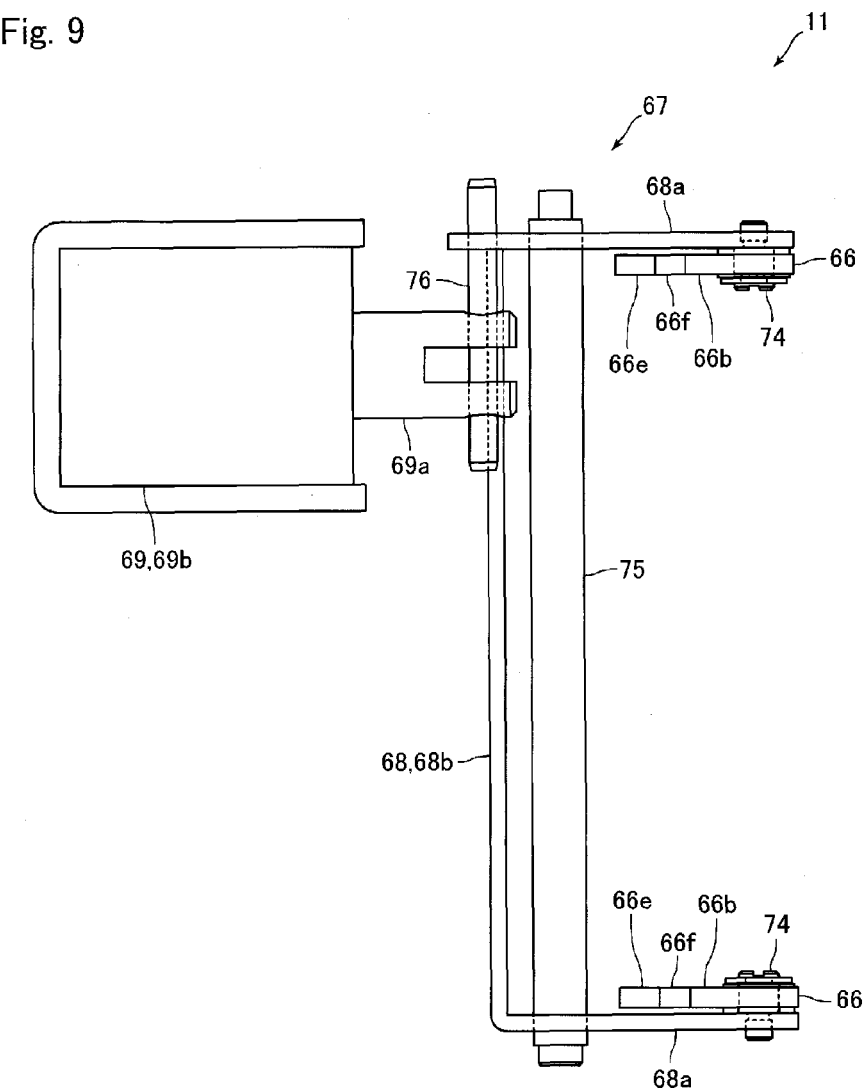
FIG. 9 is a top plan view for explaining a structure of a positioning mechanism shown in FIG. 2.
Figure 9:
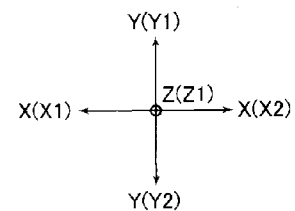

FIGS. 7(A) and 7(B) are side views for explaining a structure of a positioning member 66 of a positioning mechanism 11 and its surrounding portion shown in FIG. 2. FIGS. 8(A) and 8(B) are side views for explaining a structure of the positioning mechanism 11 and its surrounding portion shown in FIG. 2. FIG. 9 is a top plan view for explaining a structure of the positioning mechanism 11 shown in FIG. 2.

The positioning mechanism 11 includes two positioning members 66 which are formed with an abutting part 66a with which a rear end of a card 2 taken into the card reader 1 is abutted, and a retreating mechanism 67 which makes the abutting part 66a retreat from the conveying passage 5. The retreating mechanism 67 includes a link member 68 which turnably holds the positioning member 66, and a solenoid 69. Further, the positioning mechanism 11 includes two sensors 70 for respectively detecting movement of the two positioning members 66 which are capable of turning, and two tension coil springs 71 which respectively urge the two positioning members 66 (see FIG. 8(A)). The sensor 70 is a transmission type optical sensor having a light emitting element and a light receiving element which receives light from the light emitting element.

The positioning member 66 is formed in a flat plate shape. The positioning member 66 is, in addition to the above-mentioned abutting part 66a, provided with an arm part 66b which is extended to a substantially upper side from an upper end of the abutting part 66a. The two positioning members 66 are separately disposed with a predetermined space therebetween in the right and left direction. Further, the positioning member 66 is turnably held by a fixed shaft 74 which is fixed to a holding part 68a described below structuring the link member 68. The fixed shaft 74 is fixed to the link member 68 with the right and left direction as an axial direction. The positioning member 66 is turnably held by the fixed shaft 74 at a boundary part between the abutting part 66a and the arm part 66b. A turning range of the positioning member 66 is restricted by a stopper (not shown) which is formed in the link member 68 or the like.

The abutting part 66a is formed in a substantially rectangular shape which is long and thin in the upper and lower direction. The abutting part 66a is disposed on a rear side relative to the magnetic head 7 in the front and rear direction. Further, the abutting part 66a is disposed on a front side relative to the conveying roller 33 and the pad roller 36 in the front and rear direction. A front end side of the abutting part 66a is formed with a support part 66c which supports a card 2 abutting with the abutting part 66a from its under face side.

The support part 66c is formed on a lower end side of the abutting part 66a. Further, the support part 66c is formed so that its shape when viewed in the right and left direction is a substantially trapezoid shape and is protruded to a front side relative to the abutting face 66d with which a card 2 is abutted. The abutting face 66d is disposed on an upper side with respect to an inclined face which is formed on a front end side of an upper face of the guide part 27a. An upper end side of the arm part 66b is formed with a light intercepting part 66e for intercepting between a light emitting element and a light receiving element of the sensor 70. A lower side of the light intercepting part 66e is formed with a spring engaging part 66f with which one end of the tension coil spring 71 is engaged. The other end of the tension coil spring 71 is fixed to a frame of the main body part 37.

In this embodiment, when a card 2 is not abutted with the abutting part 66a, the positioning member 66 is urged in a counterclockwise direction in FIGS. 7(A) and 7(B) by an urging force of the tension coil spring 71 with the fixed shaft 74 as a center (see FIG. 7(A)). In this case, the abutting face 66*d* is inclined, for example, about 2° through 3° with respect to the upper and lower direction. In this state, when a rear end of a card 2 which is inserted through the insertion port 3 and conveyed to a rear side by the card conveying mechanism 6 is abutted with the abutting part 66*a*, as shown in FIG. 7(B), the abutting part 66*a* is pushed by the card 2 and thereby the positioning member 66 is turned in a clockwise direction in FIGS. 7(A) and 7(B) with the fixed shaft 74 as a center and is abutted with a stopper not shown. When the positioning member 66 is abutted with the stopper, the card 2 is positioned in the front and rear direction. In this case, the abutting face 66*d* is substantially parallel to the upper and lower direction.

In a case that a rear end of the card 2 is abutted with the abutting part 66*a* and the card 2 is positioned, a distance "L" in the front and rear direction between the center of the conveying roller 32 and the abutting face 66*d* (see FIG. 7(B)) is set to be shorter than a width "W1" in the short widthwise direction of the card 2. Further, a distance in the front and rear direction between the conveying roller 31 and the abutting face 66*d* is set to be longer than the width "W1" in the short widthwise direction of the card 2. A distance in the front and rear direction between the center of the conveying roller 32 and the center of the conveying roller 33 is set to be slightly shorter than the width "W1" in the short widthwise direction of the card 2.

As shown in FIG. 7(A), when a card 2 is not abutted with the abutting part 66*a*, the light intercepting part 66*e* is separated from between a light emitting element and a light receiving element of the sensor 70. On the other hand, as shown in FIG. 7(B), when a rear end of the card 2 is abutted with the abutting part 66*a*, the light intercepting part 66*e* intercepts between the light emitting element and the light receiving element of the sensor 70. In this embodiment, when lights from the light emitting elements to the light receiving elements of the two sensors 70 are intercepted by the light intercepting parts 66*e*, it is detected that a rear end of the card 2 is abutted with the two abutting parts 66*a* and the card 2 has been positioned in the front and rear direction. In other words, based on detected results of the two sensors 70, it is detected that a rear end of the card 2 is abutted with the two abutting parts 66*a* and the card 2 has been positioned at a predetermined position in the front and rear direction.

The link member 68 is, as shown in FIG. 9, provided with two flat plate-shaped holding parts 68*a* which hold the positioning members 66, and a flat plate-shaped connecting part 68*b* which connects the two holding parts 68*a* with each other. Two holding parts 68*a* are disposed with a predetermined space therebetween in the right and left direction and structure both end side portions in the right and left direction of the link member 68. A rear end side and a lower end side of the holding part 68*a* is turnably supported by the fixed shaft 75 which is fixed with the right and left direction as an axial direction. The fixed shaft 74 is fixed to a front end side of the holding part 68*a*.

The solenoid 69 is disposed so that its plunger 69*a* is moved in the front and rear direction. A fixed pin 76 is fixed to the plunger 69*a*. The fixed pin 76 is engaged with a rear end side of the holding part 68*a* disposed on the right side. A compression coil spring not shown is disposed between the main body 69*b* of the solenoid 69 and the plunger 69*a*, and the plunger 69*a* is urged in a protruding direction from the main body 69*b* by an urging force of the compression coil spring.

As shown in FIG. 8(A), when the plunger 69*a* is protruded from the main body 69*b* by an urging force of the compression coil spring, a rear end of a card 2 is capable of abutting with the abutting part 66*a*. In other words, in this case, the abutting part 66*a* is located at the abutting position where a rear end of a card 2 is capable of abutting. In this state, when the solenoid 69 is driven, the plunger 69*a* is pulled to the main body 69*b* side against an urging force of the compression coil spring and thereby the link member 68 is turned in a counterclockwise direction in FIG. 8(A) with the fixed shaft 75 as a center. When the link member 68 is turned in the counterclockwise direction, as shown in FIG. 8(B), the abutting part 66*a* is retreated from the conveying passage 5 to an upper side and thus a card 2 is capable of passing toward the conveying roller 33 and the pad roller 36. In other words, when the plunger 69*a* has been pulled to the main body 69*b* side, the abutting part 66*a* is located at the retreated position where the abutting part 66*a* is retreated from the conveying passage 5 and a card 2 is capable of passing toward the conveying roller 33 and the pad roller 36. In this embodiment, the positioning member 66 is normally located at the abutting position and, when a predetermined processing is to be performed, the positioning member 66 is moved to the retreated position.

(Specific Structure of Card Conveying Mechanism and Conveying Passage)

Figure 10:
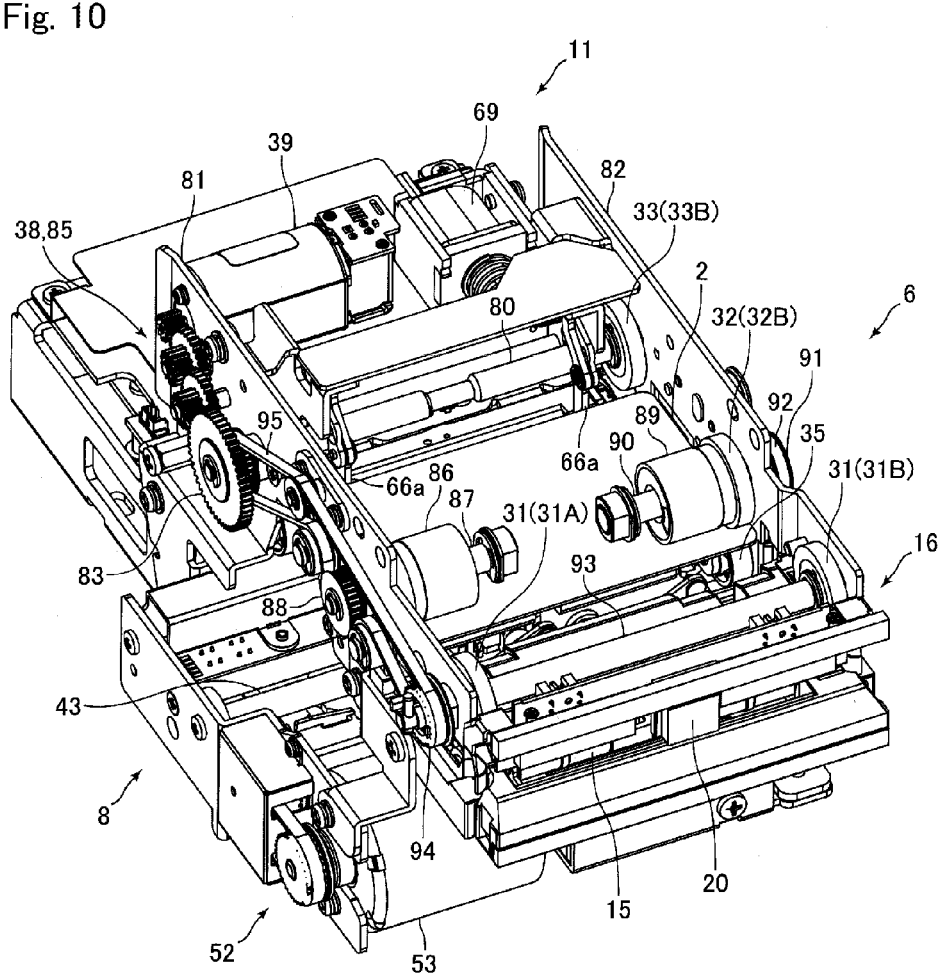
FIG. 10 is a perspective view showing a state that a card insertion part and an upper side portion of a main body part are detached from the card reader shown in FIG. 1.
Figure 10:
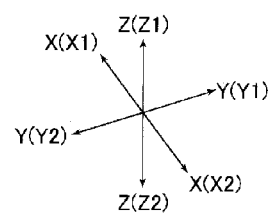

FIG. 10 is a perspective view showing a state that the card insertion part 4 and an upper side portion of the main body part 37 are detached from the card reader 1 shown in FIG. 1. FIG. 11 is a top plan view for explaining a structure of the conveying passage 5 and the card conveying mechanism 6 shown in FIG. 2. FIGS. 12(A) and 12(B) are views for explaining operation of torque limiters 86 and 89 shown in FIG. 11.

As described above, the card conveying mechanism 6 includes the conveying rollers 31 through 33 and the pad rollers 34 through 36. The conveying rollers 31 through 33 are respectively disposed at both ends in the right and left of the conveying passage 5. In other words, the card conveying mechanism 6 includes, as shown in FIG. 11, the conveying rollers 31 through 33 disposed at a left end of the conveying passage 5 so as to contact with an upper face on the left end side of a card 2 inserted so that a short widthwise direction of the card 2 is coincided with the front and rear direction (in other words, so that a longitudinal direction of the card 2 is coincided with the right and left direction), and the conveying rollers 31 through 33 disposed at a right end of the conveying passage 5 so as to contact with an upper face at the right end side of the card 2 inserted so that the short widthwise direction of the card 2 is coincided with the front and rear direction. Further, as described above, the pad rollers 34 through 36 are oppositely disposed to the conveying rollers 31 through 33 and are abutted with an under face on both end sides in a longitudinal direction of the card 2. In this embodiment, the conveying rollers 31 through 33 and the pad rollers 34 through 36 are abutted with a portion on both end sides in a longitudinal direction of the card 2 where the embossing area 2*c* is avoided.

In the following description, in a case that the conveying rollers 31 through 33 disposed at a left end of the conveying passage 5 and the conveying rollers 31 through 33 disposed at a right end of the conveying passage 5 are distinguishably described, the conveying rollers 31 through 33 disposed at a left end of the conveying passage 5 are referred to as the conveying rollers 31A through 33A, and the conveying rollers 31 through 33 disposed at a right end of the conveying passage 5 are referred to as the conveying rollers 31B through 33B.

The conveying rollers 33A and 33B are fixed to the rotation shaft 80. The rotation shaft 80 is disposed with the right and left direction as an axial direction. A left end side of the rotation shaft 80 is rotatably held by a side plate 81, which structures a part of a left side face of a frame of the main body part 37 of the card reader 1, and a right end side of the rotation shaft 80 is rotatably held by a side plate 82 which structures a part of a right side face of the frame of the main body part 37. Both ends in the right and left direction of the rotation shaft 80 are protruded to outer sides in the right and left direction from the side plates 81 and 82. A pulley 83 having a gear structuring a power transmission mechanism 38 is fixed to the left end side of the rotation shaft 80. A pulley 84 structuring the power transmission mechanism 38 is fixed to the right end side of the rotation shaft 80. A motor 39 is connected with the gear of the pulley 83 having a gear through a gear train 85 structuring the power transmission mechanism 38. In accordance with an embodiment of the present invention, a gear and a pulley may be provided individually instead of using the pulley 83 having a gear.

The conveying roller 32A is held by the rotation shaft 87 through a torque limiter 86. In other words, the torque limiter 86 is attached to the rotation shaft 87 and the conveying roller 32A is attached to the torque limiter 86. The rotation shaft 87 is disposed with the right and left direction as an axial direction. A left end side of the rotation shaft 87 is rotatably held by the side plate 81. A right end side of the rotation shaft 87 is rotatably held by a bracket (not shown) which is fixed to the side plates 81 and 82. A left end of the rotation shaft 87 is protruded to a left side relative to the side plate 81. A pulley 88 structuring the power transmission mechanism 38 is fixed to a left end side of the rotation shaft 87. The torque limiter 86 is disposed on the right side with respect to the conveying roller 32A.

The conveying roller 32B is held by a rotation shaft 90 through a torque limiter 89. In other words, the torque limiter 89 is attached to the rotation shaft 90 and the conveying roller 32B is attached to the torque limiter 89. The rotation shaft 90 is disposed with the right and left direction as an axial direction. Further, the rotation shaft 90 is coaxially disposed with the rotation shaft 87. A right end side of the rotation shaft 90 is rotatably held by the side plate 82. A left end side of the rotation shaft 90 is rotatably held by the bracket by which the right end side of the rotation shaft 87 is rotatably held. A right end of the rotation shaft 90 is protruded to the right side relative to the side plate 82. A pulley 91 structuring the power transmission mechanism 38 is fixed to a right end side of the rotation shaft 90. A belt 92 is stretched over the pulley 84 and the pulley 91. The torque limiter 89 is disposed on the left side with respect to the conveying roller 32B.

The conveying rollers 31A and 31B are fixed to a rotation shaft 93. The rotation shaft 93 is disposed with the right and left direction as an axial direction. A left end side of the rotation shaft 93 is rotatably held by the side plate 81 and a right end side of the rotation shaft 93 is rotatably held by the side plate 82. A left end of the rotation shaft 93 is protruded to a left side relative to the side plate 81. A pulley 94 structuring the power transmission mechanism 38 is fixed to a left end side of the rotation shaft 93. A belt 95 is stretched over the pulley 83 having a gear and the pulleys 88 and 94.

As described above, when a rear end of a card 2 is abutted with the abutting part 66a and the card 2 has been positioned, a distance "L" between the center of the conveying roller 32 and the abutting face 66d in the front and rear direction is set to be shorter than a width "W1" in a short widthwise direction of the card 2, and the conveying rollers 32A and 32B convey the card 2 until a rear end of the card 2 is abutted with the abutting parts 66a. In this embodiment, the conveying roller 32A is a first conveying roller which conveys the card 2 until a rear end of the card 2 is abutted with the abutting part 66a and the conveying roller 32B is a second conveying roller which conveys the card 2 until a rear end of the card 2 is abutted with the abutting part 66a. In this case, as described above, a distance between the conveying roller 31 and the abutting face 66d in the front and rear direction is set to be longer than the width "W1" in the short widthwise direction of a card 2 and, when a card 2 is to be abutted with the abutting part 66a, the card 2 is conveyed only by the conveying rollers 32A and 32B.

Further, as described above, the torque limiter 86 is attached to the rotation shaft 87 and the conveying roller 32A is attached to the torque limiter 86. In other words, the torque limiter 86 is disposed between the conveying roller 32A and the rotation shaft 87 in the power transmission path from the motor 39 to the conveying roller 32A. The torque limiter 86 in this embodiment is a first torque limiter which is disposed on the way in the power transmission path from the motor 39 as a drive source to the conveying roller 32A as the first conveying roller. Further, the rotation shaft 87 is a first rotation shaft which holds the conveying roller 32A as the first conveying roller and is rotatable together with the conveying roller 32A.

Further, as described above, the torque limiter 89 is attached to the rotation shaft 90 and the conveying roller 32B is attached to the torque limiter 89. In other words, the torque limiter 89 is disposed between the conveying roller 32B and the rotation shaft 90 in the power transmission path from the motor 39 to the conveying roller 32B. The torque limiter 89 in this embodiment is a second torque limiter which is disposed on the way in the power transmission path from the motor 39 to the conveying roller 32B as the second conveying roller. Further, the rotation shaft 90 is a second rotation shaft which holds the conveying roller 32B as the second conveying roller and is rotatable together with the conveying roller 32B.

The conveying passage 5 is structured between the side plate 81 and the side plate 82 in the right and left direction. A right side face 81a of the side plate 81 is formed in a flat face shape which is parallel to the "Z-X" plane structured of the "Z" direction and the "X" direction. The right side face 81a of the side plate 81 is a reference surface in the right and left direction for a card 2 in the card reader 1. As described below, a left end of a card 2 inserted into the card reader 1 is abutted with the right side face 81a while the card 2 is conveyed to the rear side. In other words, an abutting face with which a left end of a card 2 is abutted is formed at a left end of the conveying passage 5.

A left side face 82a of the side plate 82 is structured of two flat faces 82b and 82c parallel to the "Z-X" plane and an inclined face 82d connecting the flat face 82b with the flat face 82c. The flat face 82c is disposed on the right side relative to the flat face 82b. The inclined face 82d is disposed between the conveying roller 31 and the conveying roller 32 in the front and rear direction and is inclined so as to be widened to the right side toward the front side. Therefore, a width of the conveying passage 5 in the right and left direction (in other words, a distance between the right side face 81a of the side plate 81 and the left side face 82a of the side plate 82) is substantially constant except a part on the front end side of the conveying passage 5 where the conveying roller 31 is disposed, and a width of the conveying passage 5 in the right and left direction is enlarged on the front end side of the conveying passage 5. A width in the right and left direction of the conveying passage 5 except a part on the front end side of the conveying passage 5 is set to be slightly wider than a width in a longitudinal direction of a card 2.

As shown in FIG. 11, a guide member 79 by which the insertion port 3 is formed is disposed on a front side relative to the side plates 81 and 82, and the conveying passage 5 is also structured between a left inner side face 79a and a right inner side face 79b of the guide member 79. The left inner side face 79a is disposed in the same flat face as the right side face 81a of the side plate 81 and the right inner side face 79b is disposed on the same flat face as the flat face 82b of the side plate 82.

The conveying roller 32A and the conveying roller 33A are disposed at the same positions as each other in the right and left direction and the conveying roller 32B and the conveying roller 33B are disposed at the same positions as each other in the right and left direction. In other words, a distance between the conveying roller 32A and the conveying roller 32B in the right and left direction is the same as a distance between the conveying roller 33A and the conveying roller 33B. Further, a distance between a left end of the conveying roller 32A and a right end of the conveying roller 32B in the right and left direction is set to be slightly narrower than a width in a longitudinal direction of a card 2. In addition, the conveying rollers 32A and 32B are disposed so that the substantially entire conveying roller 32A in its widthwise direction (substantially whole in the right and left direction) is abutted with an upper face of a card 2, which is inserted so that a short widthwise direction of a card 2 and the front and rear direction are coincided with each other and is conveyed along the conveying passage 5, and that the substantially entire conveying roller 32B in its widthwise direction (substantially whole in the right and left direction) is abutted with the upper face of the card 2.

On the other hand, although the conveying roller 31A and the conveying roller 32A are disposed at the same positions as each other in the right and left direction, the conveying roller 31B is disposed on the right side relative to the conveying roller 32B. Specifically, when viewed in the upper and lower direction, the conveying roller 31B is disposed at a position where an imaginary line formed by connecting the right inner side face 79b of the guide member 79 with the flat face 82b of the side plate 82 is passed. In other words, the conveying roller 31B is disposed so as to stride over the right end of the conveying passage 5 determined by the flat face 82b (in other words, the right end of the conveying passage 5 determined by the right inner side face 79b). Further, the conveying roller 31B is disposed on the right side relative to the conveying roller 32B and thus a distance between the conveying roller 31A and the conveying roller 31B in the right and left direction is set to be wider than a distance between the conveying roller 32A and the conveying roller 32B. Further, a distance between a left end of the conveying roller 31A and a right end of the conveying roller 31B in the right and left direction is slightly wider than a width in a longitudinal direction of a card 2.

In addition, the conveying rollers 31A and 31B are disposed so that the substantially entire conveying roller 31A in its widthwise direction (substantially whole in the right and left direction) is abutted with an upper face of a card 2, which is inserted into the insertion port so that a short widthwise direction of a card 2 and the front and rear direction are coincided with each other, and that a part of the conveying roller 31B in its widthwise direction (part in the right and left direction) is abutted with the upper face of the card 2. In this embodiment, as shown in FIG. 11, the conveying roller 31B is disposed so that about half or substantially half in the widthwise direction of the conveying roller 31B is abutted with an upper face of a card 2 which has been inserted into the insertion port 3 so that the short widthwise direction of the card 2 and the front and rear direction are coincided with each other. In other words, the conveying roller 31B is disposed so that a right end of a card 2 having been inserted so that a short widthwise direction of the card 2 and the front and rear direction are coincided with each other is passed at an approximately center of the conveying roller 31B in the right and left direction. The conveying roller 31A in this embodiment is a third conveying roller which is disposed on a front side relative to the conveying roller 32A as the first conveying roller and the conveying roller 32B as the second conveying roller, and the conveying roller 31B is a fourth conveying roller which is disposed on a front side relative to the conveying rollers 32A and 32B.

In this embodiment, the substantially entire conveying roller 31A in its widthwise direction is abutted with an upper face of a card 2, which is inserted into the insertion port so that a short widthwise direction of a card 2 and the front and rear direction are coincided with each other, and a part of the conveying roller 31B in its widthwise direction is abutted with the upper face of the card 2 and thus, in a process that the card 2 inserted into the insertion port 3 is conveyed to a rear side by the conveying rollers 31A and 31B, a left end of the card 2 is abutted with the right side face 81a of the side plate 81 as shown in FIG. 11. Specifically, one end 2f in a longitudinal direction of a card 2 is abutted with the right side face 81a in a process that the card 2 inserted into the insertion port 3 in a correct posture is conveyed to a rear side by the conveying rollers 31A and 31B. When the one end 2f of the card 2 is abutted with the right side face 81a, the card 2 is positioned in the right and left direction.

As described above, except for a part on the front end side of the conveying passage 5, a width in the right and left direction of the conveying passage 5 is set to be slightly wider than a width in a longitudinal direction of a card 2. Therefore, a short widthwise direction of a card 2 which is conveyed toward the abutting parts 66a through the conveying passage 5 may be inclined with respect to the front and rear direction. For example, as shown in FIG. 12(A), there may be a case that, although a left end side of one end 2d of the card 2 is abutted with the abutting part 66a disposed on the left side, a right end side of one end 2d of the card 2 is not abutted with the abutting part 66a disposed on the right side. In this case, when the motor 39 is continued to rotate, power transmission from the motor 39 to the conveying roller 32A is cut off through operation of the torque limiter 86 and the rotation of the conveying roller 32A is stopped and the rotation shaft 87 is idly rotated with respect to the conveying roller 32A. Further, in this case, when the motor 39 is continued to rotate, power from the motor 39 is transmitted to the conveying roller 32B and the conveying roller 32B is rotated and thus, the right end side of the card 2 is conveyed until the right end side of the one end 2d of the card 2 is abutted with the abutting part 66a disposed on the right side.

Similarly, for example, as shown in FIG. 12(B), there may be a case that, although a right end side of the one end 2d of the card 2 is abutted with the abutting part 66a disposed on the right side, a left end side of the one end 2d of the card 2 is not abutted with the abutting part 66a disposed on the left side. In this case, when the motor 39 is continued to rotate, power transmission from the motor 39 to the conveying roller 32B is cut off through operation of the torque limiter 89 and the rotation of the conveying roller 32B is stopped and the rotation shaft 90 is idly rotated with respect to the conveying roller 32B. Further, in this case, when the motor 39 is continued to rotate, power from the motor 39 is transmitted to the conveying roller 32A and the conveying roller 32A is rotated and thus, the left end side of the card 2 is conveyed until the left end side of the one end 2d of the card 2 is abutted with the abutting part 66a disposed on the left side.

(Schematic Operation of Card Reader)

In the card reader 1 structured as described above, in a standby state before a card 2 is inserted into the insertion port 3, the shutter member 14 is located at the close position and the conveying passage 5 is closed. Further, in this standby state, the magnetic head 7 is located at the head retreated position where the magnetic head 7 is retreated from the conveying passage 5, and the IC contact block 9 is located at the spring retreated position where the IC contact block 9 is retreated from the conveying passage 5. In addition, in this standby state, the abutting parts 66*a* are located at the abutting position.

The shutter member 14 is moved to the open position based on the following detected results. In other words, it is detected that a card 2 has been inserted into the insertion port 3 based on a detected result by the sensor 21, it is detected that the card 2 has been inserted into the insertion port 3 so that the short widthwise direction of the card 2 is coincided with the front and rear direction based on a detected result by the sensors structuring the insertion detection mechanism 16 and, in addition, it is detected that one end 2*d* side of the card 2 has been inserted in a state that a rear face of the card 2 having the terminal part 2*b* and recorded magnetic data faces a lower side based on detected results by the magnetic sensors 17 and 18 and the metal sensor 19. In other words, when it is detected that a normal card 2 is inserted into the insertion port 3 in a correct posture, the shutter member 14 is moved to the open position.

Further, when it is detected that a normal card 2 has been inserted into the insertion port 3 in a correct posture, the motor 39 is activated and the card conveying mechanism 6 conveys the card 2 to a rear side. When one end 2*d* of the card 2 is abutted with the abutting part 66*a* of the positioning member 66, the light from the light emitting element to the light receiving element of the sensor 70 is intercepted by the light intercepting part 66*e*. As described above, in this embodiment, when the one end 2*d* of a card 2 is abutted with both of the two abutting parts 66*a* disposed with a predetermined distance therebetween in the right and left direction and lights from light emitting elements to light receiving elements of the two sensors 70 are intercepted by the light intercepting parts 66*e*, it is detected that the card 2 has been positioned in the front and rear direction.

When it is detected that the card 2 has been positioned, the motor 39 is stopped. In other words, the motor 39 is driven until it is detected, based on detected results of two sensors 70, that the one end 2*d* of a card 2 is abutted with two abutting parts 66*a* and the card 2 has been positioned at a predetermined position in the front and rear direction. Therefore, for example, as shown in FIG. 12(A), in a case that, although a left end side of one end 2*d* of a card 2 is abutted with the abutting part 66*a* disposed on the left side, a right end side of the one end 2*d* of the card 2 is not abutted with the abutting part 66*a* disposed on the right side, the motor 39 is driven until the right end side of the one end 2*d* of the card 2 is abutted with the abutting part 66*a* disposed on the right side and thereby light from a light emitting element to a light receiving element of the sensor 70 disposed on the right side is intercepted by the light intercepting part 66*e*. Similarly, as shown in FIG. 12(B), in a case that, although a right end side of one end 2*d* of a card 2 is abutted with the abutting part 66*a* disposed on the right side, a left end side of the one end 2*d* of the card 2 is not abutted with the abutting part 66*a* disposed on the left side, the motor 39 is driven until the left end side of the one end 2*d* of the card 2 is abutted with the abutting part 66*a* disposed on the left side and thereby light from a light emitting element to a light receiving element of the sensor 70 disposed on the left side is intercepted by the light intercepting part 66*e*.

In this embodiment, when the one end 2*d* of the card 2 is abutted with the abutting parts 66*a*, the entire card 2 has been taken into a rear side relative to the shutter member 14 and thus, when the one end 2*d* of the card 2 is abutted with the abutting parts 66*a* and it is detected that the card 2 has been positioned in the front and rear direction, the shutter member 14 is moved to the close position and the conveying passage 5 is closed.

After that, the motor 53 is activated and the magnetic head 7 is moved in the right and left direction while abutting with a magnetic stripe 2*a* of the card 2 and thereby reading and recording of magnetic data are performed. As described above, the distance "L" in the front and rear direction between the center of the conveying roller 32 and the abutting face 66*d* is set to be shorter than the width "W1" in the short widthwise direction of the card 2 and, in a state that the one end 2*d* of the card 2 is abutted with the abutting faces 66*d*, a front end side of the card 2 is sandwiched between the conveying roller 32 and the pad roller 35. In this embodiment, the magnetic head 7 is moved in the right and left direction while the card 2 is held between the conveying roller 32 and the pad roller 35 in a state that the one end 2*d* of the card 2 is pressed against the abutting faces 66*d* by the card conveying mechanism 6 and thereby reading and recording of magnetic data are performed.

Further, the solenoid 63 is activated and thereby the IC contact springs 59 are contacted with the external connection terminals which structure the terminal part 2*b* of the card 2 to perform data communication with the card 2. In this case, in a state that the one end 2*d* of the card 2 is pressed against the abutting faces 66*d*, the IC contact block 9 is moved down while the card 2 is held between the conveying roller 32 and the pad roller 35 to make the IC contact springs 59 contact with the external connection terminals.

(Principal Effects in this Embodiment)

As described above, in this embodiment, in a card 2 with a magnetic stripe 2*a* in conformity with the international standard or JIS standard, the magnetic head 7 is moved and reading and recording of magnetic data are performed in a state that one end 2*d* of the card 2 which is the reference of a forming range of the magnetic stripe 2*a* is abutted with the abutting part 66*a* and thereby the card 2 is positioned. Therefore, in this embodiment, when reading and recording of magnetic data are to be performed, aligning of the magnetic head 7 with the magnetic stripe 2*a* can be performed with a high degree of accuracy. Accordingly, in this embodiment, even when a card 2 with a magnetic stripe 2*a* in conformity with the international standard or JIS standard is conveyed in its short widthwise direction and is processed, lowering of reading accuracy and recording accuracy of magnetic data can be suppressed.

Further, in this embodiment, the conveying rollers 32A and 32B for conveying a card 2 until one end 2*d* of the card 2 is abutted with the abutting part 66*a* are respectively disposed on both ends in the right and left direction of the conveying passage 5. Therefore, according to this embodiment, a card 2 can be conveyed so that a short widthwise direction of the card 2 is not inclined with respect to the front and rear direction. Further, in this embodiment, two abutting parts 66*a* are disposed with a predetermined distance therebetween in the right and left direction and thus, when the card 2 is abutted with the abutting parts 66*a*, inclination in a short widthwise direction of the card 2 with respect to the front and rear direction can be made small.

In this embodiment, the torque limiter 86 is disposed between the conveying roller 32A and the rotation shaft 87 in the power transmission path from the motor 39 to the conveying roller 32A, and the torque limiter 89 is disposed between the conveying roller 32B and the rotation shaft 90 in the power transmission path from the motor 39 to the conveying roller 32B. Further, as described above, in a case that, although a left end side of the one end 2*d* of a card 2 is abutted with the abutting part 66*a*, a right end side of the one end 2*d* of the card 2 is not abutted with the abutting part 66*a*, when the motor 39 is continued to rotate, rotation of the conveying roller 32A is stopped through operation of the torque limiter 86 and the conveying roller 32B is rotated until the right end side of the one end 2*d* of the card 2 is abutted with the abutting part 66*a*. Further, as described above, in a case that, although a right end side of the one end 2*d* of a card 2 is abutted with the abutting part 66*a*, a left end side of the one end 2*d* of the card 2 is not abutted with the abutting part 66*a*, when the motor 39 is continued to rotate, rotation of the conveying roller 32B is stopped through operation of the torque limiter 89 and the conveying roller 32A is rotated until the left end side of the one end 2*d* of the card 2 is abutted with the abutting part 66*a*. Further, as described above, the motor 39 is driven until the one end 2*d* of a card 2 is abutted with two abutting parts 66*a* and it is detected, based on detected results of the two sensors 70, that the card 2 has been positioned at a predetermined position in the front and rear direction.

Therefore, in this embodiment, even when a short widthwise direction of a card 2 conveyed toward the abutting parts 66*a* is inclined with respect to the front and rear direction, the inclination of the short widthwise direction of the card 2 with respect to the front and rear direction can be amended by abutting both end sides of one end 2*d* of the card 2 in a longitudinal direction of the card 2 with the abutting parts 66*a*. Accordingly, in this embodiment, inclination of a magnetic stripe 2*a* of a card 2 abutted with the abutting parts 66*a* with respect to the right and left direction can be restrained. In other words, in this embodiment, inclination of a magnetic stripe 2*a* of a card 2 abutted with the abutting parts 66*a* with respect to a moving direction of the magnetic head 7 can be restrained. As a result, according to this embodiment, lowering of reading accuracy and recording accuracy of magnetic data can be suppressed.

In this embodiment, the conveying rollers 31 through 33 and the pad rollers 34 through 36 are respectively disposed on both ends in the right and left direction of the conveying passage 5. Therefore, in this embodiment, even when an embossed card 2 in conformity with the international standard or JIS standard is conveyed, contacting of characters or digits (embossed portion) formed by embossing with the conveying rollers 31 through 33 and the pad rollers 34 and 36 can be prevented. Therefore, according to this embodiment, a slip of a card 2 or damage of the embossed portion which may be occurred by contacting of the conveying rollers 31 through 33 and the pad rollers 34 through 36 with the embossed portion when the card is conveyed can be prevented.

In this embodiment, the conveying roller 32A and the conveying roller 32B are rotated by power transmitted from the common motor 39. Therefore, according to this embodiment, in comparison with a case that a motor for rotating the conveying roller 32A and a motor for rotating the conveying roller 32B are separately provided, a structure of the card conveying mechanism 6 can be simplified.

In this embodiment, the conveying rollers 31A and 31B are disposed so that the substantially whole in the widthwise direction of the conveying roller 31A is abutted with an upper face of a card 2 inserted into the insertion port 3 so that the short widthwise direction of the card 2 and the front and rear direction are coincided with each other, and that a part in the widthwise direction of the conveying roller 31B is abutted with the upper face of the card 2. Therefore, in this embodiment, as described above, in a process that a card 2 inserted into the insertion port 3 in a correct posture is conveyed to a rear side by the conveying rollers 31A and 31B, one end 2*f* in a longitudinal direction of the card 2 is abutted with the right side face 81*a* of the side plate 81. Accordingly, in this embodiment, with a simple structure that a position of the conveying roller 31B is displaced in the right and left direction, a card 2 can be shifted toward the right side face 81*a* which is a reference surface while the card 2 inserted into the insertion port 3 is conveyed by the conveying rollers 31A and 31B. As a result, when the one end 2*d* in the short widthwise direction of a card 2 is abutted with the abutting part 66*a*, the one end 2*f* in a longitudinal direction of the card 2 can be abutted with the right side face 81*a*. Therefore, according to this embodiment, when recording of magnetic data is to be performed by the magnetic head 7, accuracy of recording position of magnetic data in the right and left direction can be secured. Further, in a case that the IC contact springs 59 are to be contacted with external connection terminals of a card 2, the IC contact springs 59 can be contacted with the external connection terminals, which are formed at a predetermined position with the one end 2*d* of the card 2 and the one end 2*f* of the card 2 as references, with a high degree of accuracy.

Other Embodiments

Although the present invention has been shown and described with reference to a specific embodiment, various changes and modifications will be apparent to those skilled in the art from the teachings herein.

In the embodiment described above, the torque limiter 86 is disposed between the conveying roller 32A and the rotation shaft 87 in a power transmission path from the motor 39 to the conveying roller 32A. However, the present invention is not limited to this embodiment. For example, the torque limiter 86 may be disposed between the rotation shaft 87 and the pulley 88 in a power transmission path from the motor 39 to the conveying roller 32A, or may be disposed between a gear of the pulley 83 having a gear and a pulley of the pulley 83. Further, in the embodiment described above, the torque limiter 89 is disposed between the conveying roller 32B and the rotation shaft 90 in the power transmission path from the motor 39 to the conveying roller 32B. However, the torque limiter 89 may be disposed between the rotation shaft 90 and the pulley 91 or between the rotation shaft 80 and the pulley 84 in the power transmission path from the motor 39 to the conveying roller 32B.

In the embodiment described above, the rotation shaft 87 and the rotation shaft 90 are coaxially disposed with each other and the conveying roller 32A and the conveying roller 32B are disposed at the same position as each other in the front and rear direction. However, the present invention is not limited to this embodiment. For example, the conveying roller 32A and the conveying roller 32B may be displaced from each other in the front and rear direction. Further, in the embodiment described above, the common motor 39 is connected with the conveying rollers 32A and 32B, but a motor for driving the conveying roller 32A and a motor for driving the conveying roller 32B may be provided separately. Further, in the embodiment described above, two abutting parts 66*a* are disposed with a predetermined distance therebetween in the right and left direction, but three or more abutting parts 66*a* may be disposed with a predetermined distance therebetween in the right and left direction. Further, one abutting part 66a may be disposed in a center portion of the conveying passage 5 in the right and left direction.

In the embodiment described above, the sensor 70 is an optical type sensor. However, the present invention is not limited to this embodiment. For example, the sensor 70 may be a mechanical sensor such as a micro switch. Further, in the embodiment described above, the respective pad rollers 34 through 36 are oppositely disposed to the respective conveying rollers 31 through 33. However, conveying rollers connected with a drive source such as a motor may be oppositely disposed to the respective conveying rollers 31 through 33. Further, in the embodiment described above, the support part 66c is formed in the abutting part 66a but no support part 66c may be formed in the abutting part 66a.

In the embodiment described above, the conveying roller 31B is disposed on the right side relative to the conveying roller 32B, but the conveying roller 31B may be disposed at the same position as the conveying roller 32B in the right and left direction. In other words, a distance between the conveying roller 32A and the conveying roller 32B in the right and left direction may be equal to a distance between the conveying roller 31A and the conveying roller 31B.

In the embodiment described above, outer diameters of the conveying rollers 31A and 31B are, as shown in FIG. 11, constant in their widthwise directions (right and left direction). However, the present invention is not limited to this embodiment. For example, at least one of an outer diameter of the conveying roller 31A and an outer diameter of the conveying roller 31B may be gradually reduced from the left end toward the right end. In other words, at least one of the conveying roller 31A and the conveying roller 31B may be a tapered roller whose outer diameter is gradually reduced from the left end to the right end. In this case, even when a distance between the conveying roller 32A and the conveying roller 32B in the right and left direction is equal to a distance between the conveying roller 31A and the conveying roller 31B, in a process that a card 2 inserted into the insertion port 3 in a correct posture is conveyed to a rear side by the conveying rollers 31A and 31B, the one end 2f of the card 2 can be abutted with the right side face 81a of the side plate 81. When both of the conveying roller 31A and the conveying roller 31B are tapered rollers, a card 2 inserted into the insertion port 3 is easily shifted toward the right side face 81a.

In the embodiment described above, the card 2 is that made of vinyl chloride whose thickness is about 0.7-0.8 mm. However, the present invention is not limited to this embodiment. For example, the card 2 may be a PET (polyethylene terephthalate) card whose thickness is about 0.18-0.36 mm or may be a paper card having a predetermined thickness. Further, in the embodiment described above, a contact type IC card 2 with a magnetic stripe is processed in the card reader 1. However, a card with a magnetic stripe having no IC chip may be processed in the card reader 1. In this case, the card reader 1 may be provided with no IC contact block 9, no metal sensor 19 and the like.

In the embodiment described above, a magnetic stripe 2a is formed on a rear face of the card 2. However, the present invention is not limited to this embodiment. For example, a magnetic stripe may be formed on a front face of the card 2 instead of a rear face of the card 2 or in addition to the rear face of the card 2. For example, a magnetic stripe in conformity with the standard of JISX6302 may be formed on a front face of the card 2. In a case that a magnetic stripe is formed on only a front face of the card 2, the magnetic head 7 is disposed on an upper side with respect to the conveying passage 5. Further, in a case that a magnetic stripe is formed on a front face of the card 2 in addition to the magnetic stripe 2a, the magnetic head 7 is disposed on both of an upper side and a lower side with respect to the conveying passage 5.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card formed in a substantially rectangular shape which is conveyed in its short widthwise direction and is processed, the card reader comprising:
   a card conveying mechanism structured to convey the card;
   a conveying passage where the card is conveyed;
   a magnetic head structured to abut a magnetic stripe formed on the card and structured to perform at least one of reading of magnetic data recorded on the card and recording of magnetic data on the card;
   a head moving mechanism structured to move the magnetic head in a widthwise direction of the conveying passage which is perpendicular to a conveying direction of the card; and
   an abutting part with which one end of the card in the conveying direction of the card is abutted;
   wherein the card conveying mechanism comprises a drive source, and a first conveying roller and a second conveying roller structured to convey -the card until the one end of the card in the conveying direction of the card is abutted with the abutting part;
   wherein the first conveying roller is disposed on one end side in the widthwise direction of the conveying passage so as to contact with a front face or a rear face on one end side in a longitudinal direction of the card;
   wherein the second conveying roller is disposed on the other end side in the widthwise direction of the conveying passage so as to contact with the front face or the rear face on the other end side in the longitudinal direction of the card; and
   wherein the card conveying mechanism comprises a first torque limiter which is disposed in a power transmission path from the drive source to the first conveying roller, and a second torque limiter which is disposed in a power transmission path from the drive source to the second conveying roller.

2. The card reader according to claim 1, wherein
   the card conveying mechanism comprises a first rotation shaft, which holds the first conveying roller and is rotatable together with the first conveying roller, and a second rotation shaft which holds the second conveying roller and is rotatable together with the second conveying roller, and
   the first torque limiter is disposed between the first rotation shaft and the first conveying roller, and the second torque limiter is disposed between the second rotation shaft and the second conveying roller.

3. The card reader according to claim 1, wherein the card conveying mechanism comprises a common motor as the drive source which is connected with the first conveying roller and the second conveying roller.

4. The card reader according to claim 1, wherein the abutting part is provided at two positions so as to be disposed with a predetermined distance therebetween in the widthwise direction of the conveying passage.

5. The card reader according to claim 4, further comprising:
two positioning members which are formed with the abutting part and are structured to turn with the widthwise direction of the conveying passage as an axial direction of turning; and
two sensors structured to detect respective movements of the two positioning members;
wherein based on detected results of the two sensors, it is detected that the one end of the card in the conveying direction of the card is abutted with the two abutting parts and the card has been positioned in the conveying direction of the card.

6. The card reader according to claim 5, wherein the drive source is driven until, based on the detected results of the two sensors, it is detected that the one end of the card in the conveying direction of the card is abutted with the two abutting parts and the card has been positioned in the conveying direction of the card.

7. The card reader according to claim 1,
further comprising an insertion port into which the card is inserted,
wherein one end of the conveying passage in the widthwise direction of the conveying passage is formed with an abutting face with which one end of the card in the longitudinal direction of the card is capable of abutting,
wherein the card conveying mechanism comprises a third conveying roller and a fourth conveying roller which are disposed on a front side relative to the first conveying roller and the second conveying roller in a taking-in direction of the card,
wherein the third conveying roller is disposed on one end side in the widthwise direction of the conveying passage so as to contact with the front face or the rear face of the one end side in the longitudinal direction of the card and is disposed so that a substantially whole width of the third conveying roller in a widthwise direction of the third conveying roller is contacted with the front face or the rear face of the card inserted into the insertion port, and
wherein the fourth conveying roller is disposed on the other end side in the widthwise direction of the conveying passage so as to contact with the front face or the rear face of the other end side in the longitudinal direction of the card and is disposed so that a part of the fourth conveying roller in a widthwise direction of the fourth conveying roller is contacted with the front face or the rear face of the card inserted into the insertion port.

8. The card reader according to claim 7, wherein the fourth conveying roller is disposed so that approximately half of the fourth conveying roller in the widthwise direction of the fourth conveying roller is contacted with the front face or the rear face of the card inserted into the insertion port.

9. The card reader according to claim 7, further comprising an IC contact spring structured to contact with an external connection terminal of an IC chip formed on the card,
wherein the IC contact spring is disposed on one end side in the widthwise direction of the conveying passage.

10. The card reader according to claim 1, further comprising an insertion port into which the card is inserted,
wherein one end of the conveying passage in the widthwise direction of the conveying passage is formed with an abutting face with which one end of the card in the longitudinal direction of the card is abutted,
wherein the card conveying mechanism comprises a third conveying roller and a fourth conveying roller which are disposed on a front side relative to the first conveying roller and the second conveying roller in a taking-in direction of the card,
wherein the third conveying roller is disposed on one end side in the widthwise direction of the conveying passage so as to contact with the front face or the rear face of the one end side in the longitudinal direction of the card,
wherein the fourth conveying roller is disposed on the other side in the widthwise direction of the conveying passage so as to contact with the front face or the rear face of the other end side in the longitudinal direction of the card, and
wherein an outer diameter of the third conveying roller is gradually reduced from the one end side toward the other end side in the widthwise direction of the conveying passage.

11. The card reader according to claim 1, further comprising an insertion port into which the card is inserted,
wherein one end of the conveying passage in the widthwise direction of the conveying passage is formed with an abutting face with which one end of the card in the longitudinal direction of the card is abutted,
wherein the card conveying mechanism comprises a third conveying roller and a fourth conveying roller which are disposed on a front side relative to the first conveying roller and the second conveying roller in a taking-in direction of the card,
wherein the third conveying roller is disposed on one end side in the widthwise direction of the conveying passage so as to contact with the front face or the rear face of the one end side in the longitudinal direction of the card,
wherein the fourth conveying roller is disposed on the other side in the widthwise direction of the conveying passage so as to contact with the front face or the rear face of the other end side in the longitudinal direction of the card, and
wherein an outer diameter of the fourth conveying roller is gradually reduced from the one end side toward the other end side in the widthwise direction of the conveying passage.

* * * * *